(12) United States Patent
Diankov et al.

(10) Patent No.: US 10,562,188 B1
(45) Date of Patent: Feb. 18, 2020

(54) AUTOMATED PACKAGE REGISTRATION SYSTEMS, DEVICES, AND METHODS

(71) Applicant: MUJIN, Inc., Tokyo (JP)

(72) Inventors: Rosen Diankov, Tokyo (JP); Huan Liu, Tokyo (JP); Xutao Ye, Tokyo (JP); Jose Jeronimo Moreira Rodrigues, Tokyo (JP); Yoshiki Kanemoto, Tokyo (JP); Jinze Yu, Tokyo (JP); Russell Islam, Tokyo (JP)

(73) Assignee: MUJIN, Inc., Tokyo (JP)

( * ) Notice: Subject to any disclaimer, the term of this patent is extended or adjusted under 35 U.S.C. 154(b) by 0 days.

(21) Appl. No.: 16/443,743

(22) Filed: Jun. 17, 2019

Related U.S. Application Data

(63) Continuation of application No. 16/290,741, filed on Mar. 1, 2019.

(60) Provisional application No. 62/752,756, filed on Oct. 30, 2018.

(51) Int. Cl.
*B25J 9/16* (2006.01)
*G06T 7/00* (2017.01)
*B25J 13/08* (2006.01)
*G06T 7/50* (2017.01)
*G06T 7/13* (2017.01)
*G06K 9/62* (2006.01)

(52) U.S. Cl.
CPC ............ *B25J 9/1697* (2013.01); *B25J 13/085* (2013.01); *G06K 9/6215* (2013.01); *G06T 7/001* (2013.01); *G06T 7/13* (2017.01); *G06T 7/50* (2017.01); *G05B 2219/39001* (2013.01); *G05B 2219/40067* (2013.01); *G06T 2207/20212* (2013.01)

(58) Field of Classification Search
CPC ......... B25J 9/1697; B25J 13/085; G06T 7/50; G06T 7/13; G06T 7/001; G06T 2207/20212; G06K 9/6215; G05B 2219/39001; G05B 2219/40067
See application file for complete search history.

(56) References Cited

U.S. PATENT DOCUMENTS

| | | | |
|---|---|---|---|
| 6,290,454 | B1 | 9/2001 | Huang et al. |
| 9,272,417 | B2 | 3/2016 | Konolige et al. |
| 10,124,489 | B2 | 11/2018 | Chitta et al. |
| 10,369,701 | B1 | 8/2019 | Diankov et al. |
| 2010/0222915 | A1 | 9/2010 | Kuehnemann et al. |

(Continued)

FOREIGN PATENT DOCUMENTS

| | | |
|---|---|---|
| JP | 2894449 B1 | 5/1999 |
| JP | 2002013913 A | 1/2002 |
| JP | 3277739 B2 | 4/2002 |

OTHER PUBLICATIONS

U.S. Patent Office Non-Final Office Action dated Apr. 18, 2019 for U.S. Appl. No. 16/290,741, filed Mar. 1, 2019, 20 pages.

(Continued)

*Primary Examiner* — Brenda C Bernardi
(74) *Attorney, Agent, or Firm* — Perkins Coie LLP

(57) ABSTRACT

A method of operating a package handling system includes: receiving first image data representative of a first surface image of a package surface; identifying a pair of intersecting edges for the package surface based on the first image; determining a minimum viable region based on the pair of edges, the minimum viable region for gripping and lifting the package; receiving second image data representative of the package after the lift; and creating registration data based on the third image data.

19 Claims, 13 Drawing Sheets

(56) References Cited

U.S. PATENT DOCUMENTS

2015/0066199 A1  3/2015  Shimono
2018/0243904 A1  8/2018  Bradski et al.

OTHER PUBLICATIONS

U.S. Patent Office Notice of Allowance dated Jun. 7, 2019 for U.S. Appl. No. 16/290,741, filed Mar. 1, 2019, 8 pages.
Korean Intellectual Property Office, International Application Division, International Search Authority, International Search Report and Written Opinion for PCT/US2019/035608 filed Jun. 5, 2019, dated Aug. 29, 2019, 9 pages.

Surface Image Legend

Registered Packages

Symbology Legend

Registered Package

Symbology Legend (Registered Package)

Symbology Legend (Unregistered Packages)

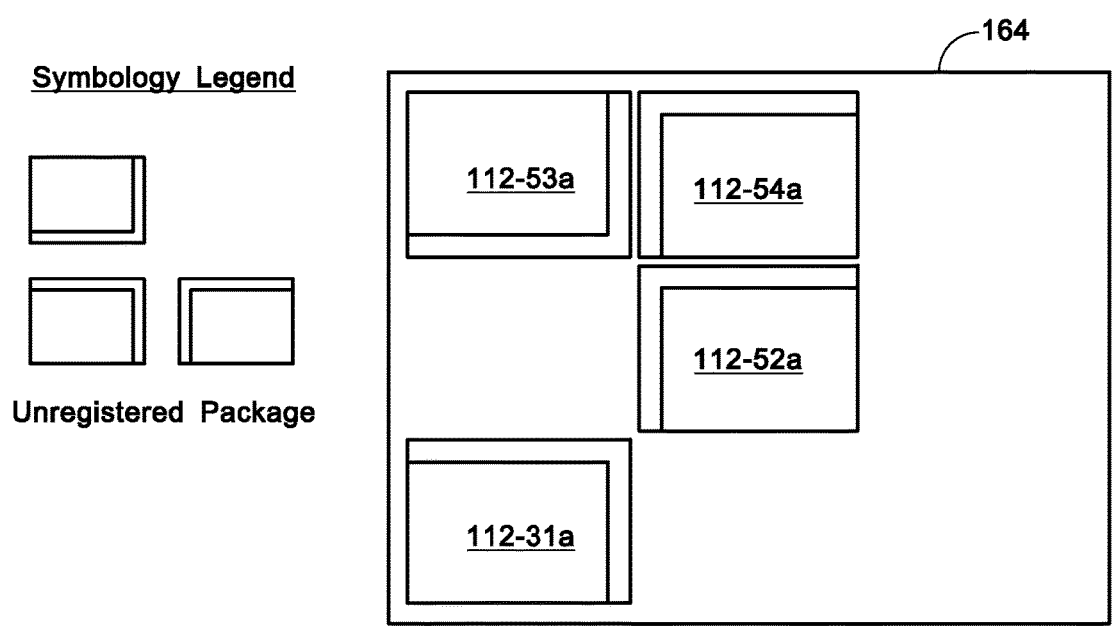
FIG. 4L
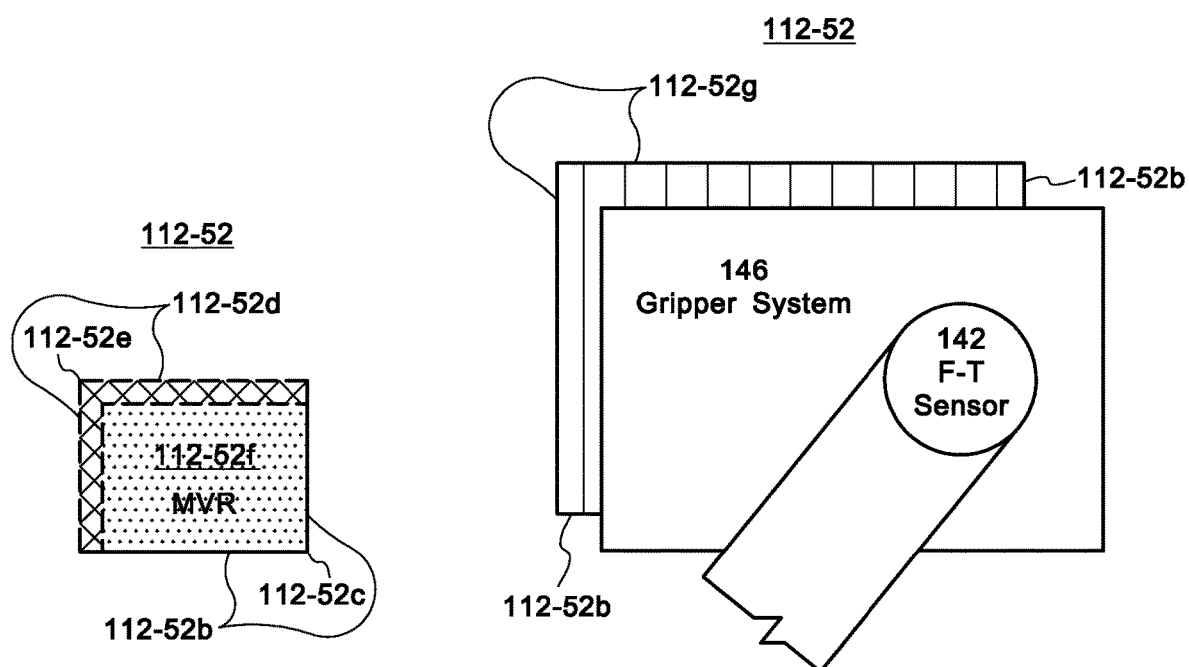
FIG. 4M
FIG. 4N

AUTOMATED PACKAGE REGISTRATION SYSTEMS, DEVICES, AND METHODS

CROSS-REFERENCE TO RELATED APPLICATION

This application is a continuation of U.S. patent application Ser. No. 16/290,741, filed Mar. 1, 2019, which application claims the benefit of U.S. Provisional Patent Application Ser. No. 62/752,756, filed Oct. 30, 2018, both of which are incorporated by reference herein in its entirety.

This application contains subject matter related to a concurrently-filed U.S. Patent Application by Rosen N. Diankov, Huan Liu, Xutao Ye, Jose Jeronimo Moreira Rodrigues, Yoshiki Kanemoto, Jinze Yu and Russell Islam titled "AUTOMATED PACKAGE REGISTRATION SYSTEMS, DEVICES, AND METHODS," which is assigned to Mujin, Inc., is identified by Ser. No. 16/443,757, and is incorporated herein by reference in its entirety.

BACKGROUND

Often times, packages are palletized for shipment to a destination where they are de-palletized. Sometimes, they are de-palletized by human workers which can be expensive and risks bodily injuries. In industrial settings, de-palletizing operations are often performed by industrial robots such as a robotic arm that grips, lifts, transports, and delivers the package to a release point. Also, an imaging device may be employed to capture an image of a stack of packages loaded on the pallet. A system may process the image to ensure the package is efficiently handled by the robotic arm, such as by comparing the captured image with a registered image stored in a registration data source.

On occasion, the captured image of a package may match a registered image. As a result, physical characteristics (e.g., measurements of a package's dimensions, weight, and/or center or mass) of the imaged objects may be unknown. Failure to correctly identify the physical characteristics can lead to a variety of unwanted outcomes. For example, such failure could cause a stoppage, which may require manual registration of the package. Also, such failure could result in a package being mishandled, especially if the package is relatively heavy and/or lop-sided.

BRIEF DESCRIPTION OF THE DRAWINGS

FIG. 4L illustrates a fifth set of example symbologies of unregistered packages in accordance with some embodiments of the present technology.

FIG. 4M illustrates an example of unclear edges and an MVR for a newly processed package in accordance with some embodiments of the present technology.

FIG. 4N illustrates an example placement of a gripper system over the MVR of FIG. 4M in accordance with some embodiments of the present technology.

DETAILED DESCRIPTION

In the following description, several specific details are presented to provide a thorough understanding of embodiments of the inventive concepts disclosed herein. One skilled in the relevant art will recognize, however, that embodiments of the present technology disclosed herein can be practiced without one or more of the specific details, or in combination with other components, etc. In other instances, well-known implementations or operations are not shown or described in detail to avoid obscuring aspects of various embodiments of the present technology disclosed herein.

Figures 1A, 1B:
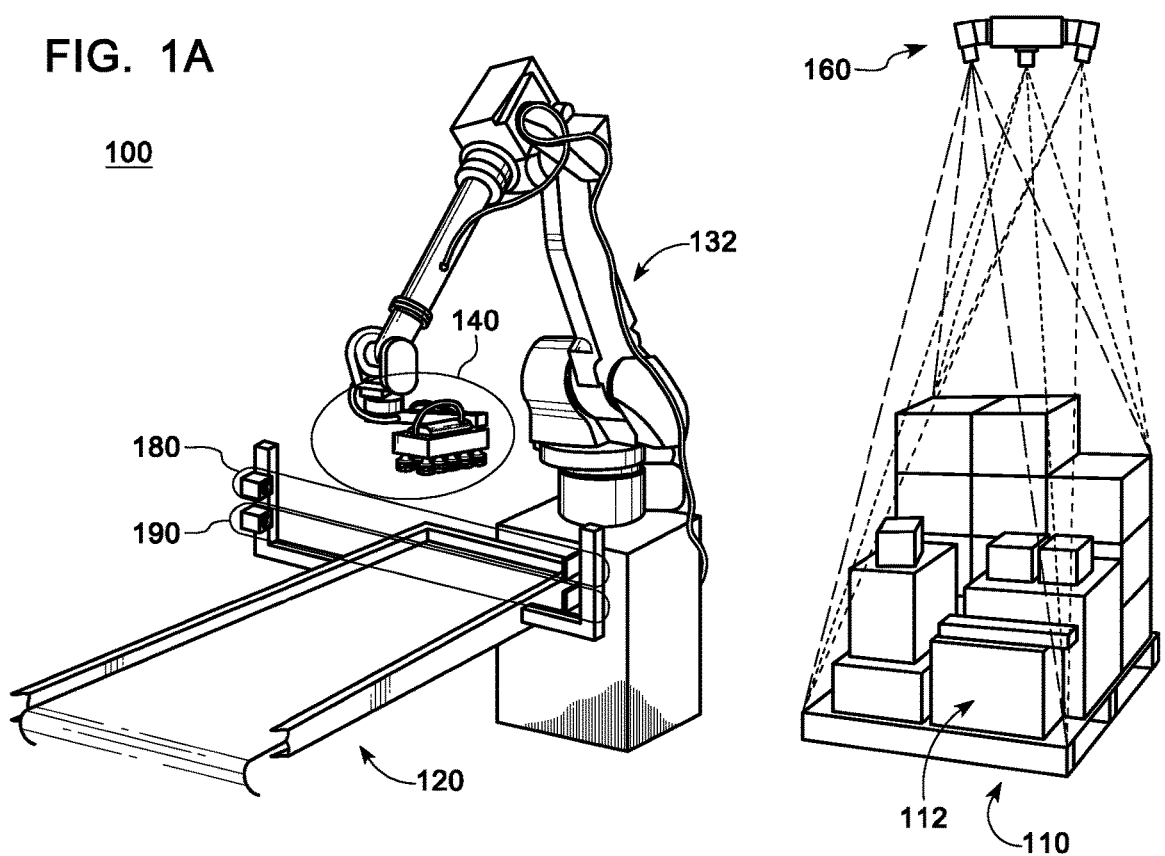
FIG. 1A illustrates a robotic system configured with a package registration mechanism in accordance with some embodiments of the present technology.
FIG. 1B is a functional block diagram of the robotic system in accordance with some embodiments of the present technology.

FIGS. 1A and 1B illustrate a robotic system 100 configured with a package registration mechanism in accordance with some embodiments of the present technology. In some embodiments, the robotic system can include a de-palletizing platform 110, a receiving platform 120, a robotic arm system 130, an end effector 140, a processing unit (PU) 150, an image system 160, a registration data source (RDS) 170, a height determination sensor (HDS) 180, and/or a release point sensor (RPS) 190.

The de-palletizing platform 110 can include any platform, surface, and/or structure upon which a plurality of packages 112 (singularly, "package 112") may be stacked and/or staged and ready to be transported to the receiving platform 120. It should be noted that, although the term "package" and "packages" will used herein, the term includes any other word that container of which, as discussed in detail below, is capable of being gripped, lifted, transported, and delivered such as, but not limited to, "case," "box", "carton," or any combination thereof. Moreover, although rectangular boxes are illustrated in the drawings disclosed herein, the shapes of the boxes are not limited to such shape but includes any regular or irregular shape that, as discussed in detail below, is capable of being gripped, lifted, transported, and delivered.

Like the de-palletizing platform 110, the receiving platform 120 can include any platform, surface, and/or structure designated to receive the packages 112 for further tasks/operations. In some embodiments, the receiving platform 120 can include a conveyor system for transporting the package 112 from one location (e.g., a release point as discussed below) to another location for further operations (e.g., sorting and/or storage).

The robotic arm system 130 can include a set of link structures, joints, motors/actuators, sensors, or a combination thereof configured to manipulate (e.g., transfer and/or rotate or reorient) the packages 112. The robotic arm system 130 can include a robotic arm 132 which, for the purpose of illustration herein and not of limitation, could be an articulated, six-axis robotic arm structure. Although the discussion herein will be drawn to the robotic arm system 130, the embodiments disclosed herein are not limited to such system but include any robotic system that may be configured to perform the actions disclosed herein.

Figure 2A:
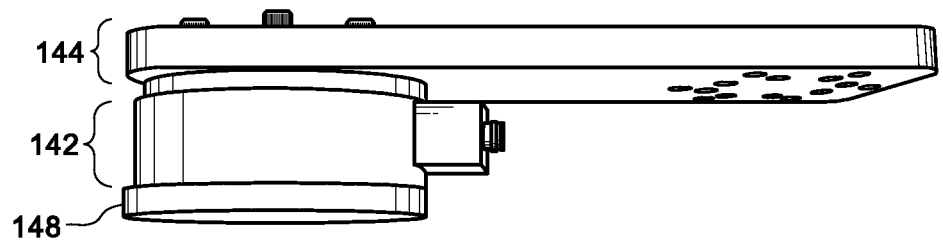
FIG. 2A illustrates a force-torque sensor in accordance with some embodiments of the present technology.
Figure 2B:
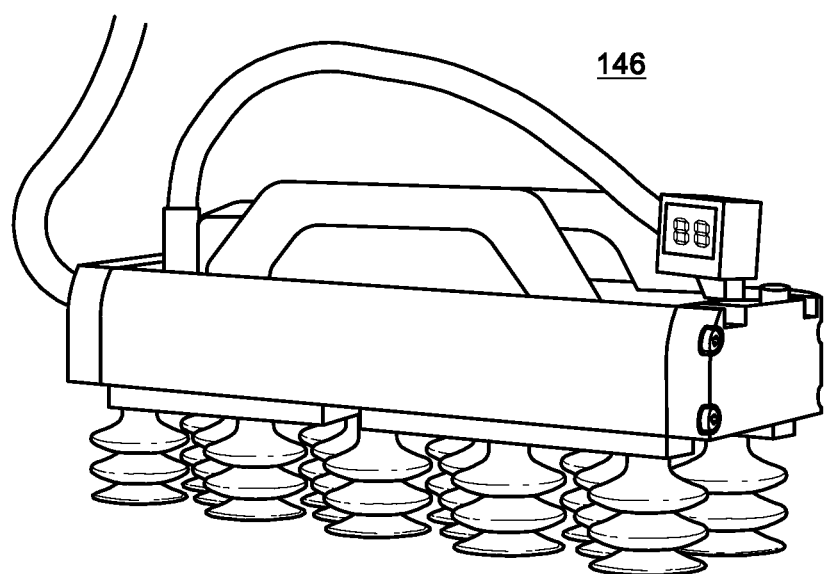
FIG. 2B illustrates a gripper in accordance with some embodiments of the present technology.

The end effector 140 can include any component or components coupled to a distal end of the robotic arm 132 configured to interact with the plurality of packages 112. For example, the end effector 140 can include structures (e.g., vacuum-based grippers) configured to grip and hold the packages 112. In some embodiments, the end effector 140 could include a force-torque (F-T) sensor 142, an arm interface 144, a gripper system 146, and/or a gripper interface 148 (as shown in FIGS. 2A and 2B).

The PU 150 of FIG. 1B can be any unit(s) or circuits programmed and/or configured to not only direct and control the movements and/or other actions of the robotic arm system 130 (including the end effector 140) but also process other related data. For example, the PU 150 can receive image data representative of a surface image (SI) of the package 112 from the image system 160 and determine a registration status of the SI according to a registration record 172 provided by the RDS 170 (discussed below), i.e., whether the package 112 is a registered instance of the package 112 or an unregistered instance of the package 112 (e.g., with no or an incomplete instance of the registration record 172 of the package 112). Also, for example, the PU 150 can direct the robotic arm system 130 to a registered instance of the package 112. Additionally, the PU 150 can apply a gripping control signal to the gripper system 146, direct the arm to the receiving platform 120, and/or release the registered instance of the package 112 on the receiving platform 120 upon receiving a release signal from the RPS 190.

The PU 150 can include any electronic data processing unit which executes software or computer instruction code that could be stored, permanently or temporarily, in a digital memory storage device or a non-transitory computer-readable media (generally, a memory 152 of FIG. 1B) including, but not limited to, random access memory (RAM), disc drives, magnetic memory, read-only memory (ROM), compact disc (CD), solid-state memory, secure digital cards, and/or compact flash cards. The PU 150 may be driven by the execution of software or computer instruction code containing algorithms developed for the specific functions embodied herein. In some embodiments, the PU 150 may be an application-specific integrated circuit (ASIC) customized for the embodiments disclosed herein. In some embodiments, the PU 150 can include one or more of microprocessors, Digital Signal Processors (DSPs), Programmable Logic Devices (PLDs), Programmable Gate Arrays (PGAs), and signal generators; however, for the embodiments herein, the term "processor" is not limited to such example processing units and its meaning is not intended to be construed narrowly. For instance, the PU 150 can also include more than one electronic data processing unit. In some embodiments, the PU 150 could be a processor(s) used by or in conjunction with any other system of the robotic system 100 including, but not limited to, the robotic arm system 130, the end effector 140, and/or the image system 160.

The PU 150 may be electronically coupled (via, e.g., wires, buses, and/or wireless connections) to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a bus, through a wireless network, or as a signal received and/or transmitted by the PU 150 via a physical or a virtual computer port. The PU 150 may be programmed or configured to execute the method discussed in detail below. In some embodiments, the PU 150 may be programmed or configured to receive data from various systems and/or units including, but not limited to, the image system 160, the RDS 170, the HDS 180, and/or the RPS 190. In some embodiments, the PU 150 may be programmed or configured to provide output data to various systems and/or units including, but not limited to, the robotic arm system 130, the end effector 140, and the RDS 170.

The image system 160 could include one or more sensors 162 configured to capture image data representative of one or more SIs of the packages 112 located on the de-palletizing platform 110. In some embodiments, the image data can represent visual designs and/or markings appearing on one or more surfaces of the package 112 from which a determination of a registration status of the package 112 may be made. In some embodiments, the image system 160 can include one or more cameras designed to work within targeted (e.g., visible and/or infrared) electromagnetic spectrum bandwidth and used to detect light/energy within the corresponding spectrum. In some embodiments, the image data could be a set of data points forming point cloud, the depth map, or a combination thereof captured from one or more three-dimensional (3-D) cameras and/or one or more two-dimensional (2-D) cameras. From these cameras, distances or depths between the image system 160 and one or more exposed (e.g., relative to a line of sight for the image system 160) surfaces of the packages 112 may be determined. In some embodiments, the distances or depths can be determined through the use of an image recognition algorithm(s), such as contextual image classification algorithm(s) and/or edge detection algorithm(s). Once determined, the distance/depth values may be used to manipulate the packages 112 via the robotic arm system 130. For example, the PU 150 and/or the robotic arm system 130 can use the distance/depth values for calculating the position from where the package 112 may be lifted and/or gripped. It should be noted that data described herein, such as the image data, can include any analog or digital signal, either discrete or continuous, which could contain information or be indicative of information.

The image system 160 can include at least one display unit 164 configured to present an image of the package(s) 112 captured by the sensors 162 that may be viewed by one or more operators of the robotic system 100 as discussed in detail below. In addition, the display units 164 can be configured to present other information such as, but not limited to, symbology representative of registered and/or unregistered instances of the packages 112 as discussed in detail below.

The RDS 170 could include any database and/or memory storage device (e.g., a non-transitory computer-readable media) configured to store the registration records 172 for a plurality of the packages 112. For example, the RDS 170 can include read-only memory (ROM), compact disc (CD), solid-state memory, secure digital cards, compact flash cards, and/or data storage servers or remote storage devices.

In some embodiments, the registration records 172 can each include physical characteristics or attributes for a corresponding package 112. For example, each registration record 172 can include, but not be limited to, one or more template SIs, 2-D or 3-D size measurements, a weight, and/or center of mass (CoM) information. The template SIs can represent known or previously determined visible characteristics of the package 112 including the design, marking, appearance, exterior shape/outline, or a combination thereof of the package 112. The 2-D or 3-D size measurements can include lengths, widths, heights, or combination thereof for the known/expected packages.

In some embodiments, the RDS 170 can be configured to receive a new instance of the registration record 172 (e.g., for a previously unknown package and/or a previously unknown aspect of a package) created in accordance with the embodiments disclosed below. Accordingly, the robotic system 100 can automate the process for registering the packages 112 by expanding the number of registration records 172 stored in the RDS 170, thereby making a de-palletizing operation more efficient with fewer unregistered instances of the packages 112. By dynamically (e.g., during operation/deployment) updating the registration records 172 in the RDS 170 using live/operational data, the robotic system 100 can efficiently implement a computer-learning process that can account for previously unknown or unexpected conditions (e.g., lighting conditions, unknown orientations, and/or stacking inconsistencies) and/or newly encountered packages. Accordingly, the robotic system 100 can reduce the failures resulting from "unknown" conditions/packages, associated human operator interventions, and/or associated task failures (e.g., lost packages and/or collisions).

The HDS 180 can include components configured to provide a vertical measurement of an object (e.g., the package 112) relative to a reference point (e.g., a surface associated with the HDS 180). For the example illustrated in FIG. 1A, the HDS 180 can send a signal to the PU 150 of FIG. 1 when a bottom portion/edge of the package 112 crosses a horizontal surface (e.g., a scanning plane) associated with the HDS 180. The PU 150 can use the signal from the HDS 180 to determine the height (e.g., according to a placement/approach orientation) of the package 112, such as according to a distance between the scanning plane of the HDS 180 (i.e., previously known) and a location of the gripper system 146 at the time the signal is generated. As disclosed below, the height of the package 112 may be added as a third-dimension measurement to 2-D measurements already registered in the registration record 172. In some embodiments, the HDS 180 can be installed on the receiving platform 120 as shown in FIG. 1A.

The RPS 190 can include components/circuits configured to trigger a signal that is provided to the PU 150 when the package 112 crosses or contacts a horizontal plane associated with the RPS 190. In some embodiments, a signal triggered by the RPS 190 may be used to determine the position at which the gripper system 146 releases the package 112 onto the receiving platform 120. In some embodiments, the RPS 190 could be installed on the receiving platform 120 as shown in FIG. 1A.

Referring now to FIG. 2A, the F-T sensor 142 can be any sensor configured to detect linear and/or moment forces along an axis and/or axes of a coordinate system. In some embodiments, the F-T sensor 142 could include a component with six-axis force sensors configured to detect up to three axis forces (e.g., forces detected along x-, y-, and z-axes of a Cartesian coordinate system) employed by the robotic system 100 of FIGS. 1A and 1B and/or three axis moments (e.g., moments detected about x-, y-, and z-axes of the Cartesian coordinate system). In some embodiments, the F-T sensor 142 could include a built-in amplifier and microcomputer for signal processing, an ability to make static and dynamic measurements, and/or an ability to detect instant changes based on a sampling interval. In some embodiments, the F-T sensor 142 could be communicatively coupled with the PU 150 of FIG. 1B via wired and/or wireless communications.

The arm interface 144 could be any device configured to couple the distal end of the robotic arm 132 of FIG. 1A to the F-T sensor 142. In some embodiments, a manufacturer of the robotic arm system 130 may be different from a manufacturer of the F-sensor 142. In such a case, ends of the arm interface 144 may have different configurations: one end being configured for coupling to the distal end, and the other end being configured for coupling to the F-T sensor 142.

Referring now to FIG. 2B, the gripper system 146 can be any system or assembly configured to grip the package 112 of FIG. 1A from its stationary position on the de-palletizing platform 110 of FIG. 1A, and sustain the grip while the package 112 is transported and delivered to the receiving platform 120 of FIG. 1A by the robotic arm system 130 of FIG. 1B. In some embodiments, the gripper system 146 could be comprised of a vacuum gripper system employing a vacuum source for gripping the package 112 at the receiving platform 120 and releasing it at the de-palletizing platform 110. In some embodiments, the vacuum gripper system could employ suction cup(s) as an interface with the package 112.

The gripper interface 148 of FIG. 2B could be any device configured to couple the F-T sensor 142 to the gripper system 146. In some embodiments, a manufacturer of the F-T sensor 142 may be different from a manufacturer of the gripper system 146. In such a case, opposing sides of the gripper interface 148 may have different configurations: one side being configured for coupling to the F-T sensor 142, and the opposing side being configured for coupling to the gripper system 146.

Figure 3A:
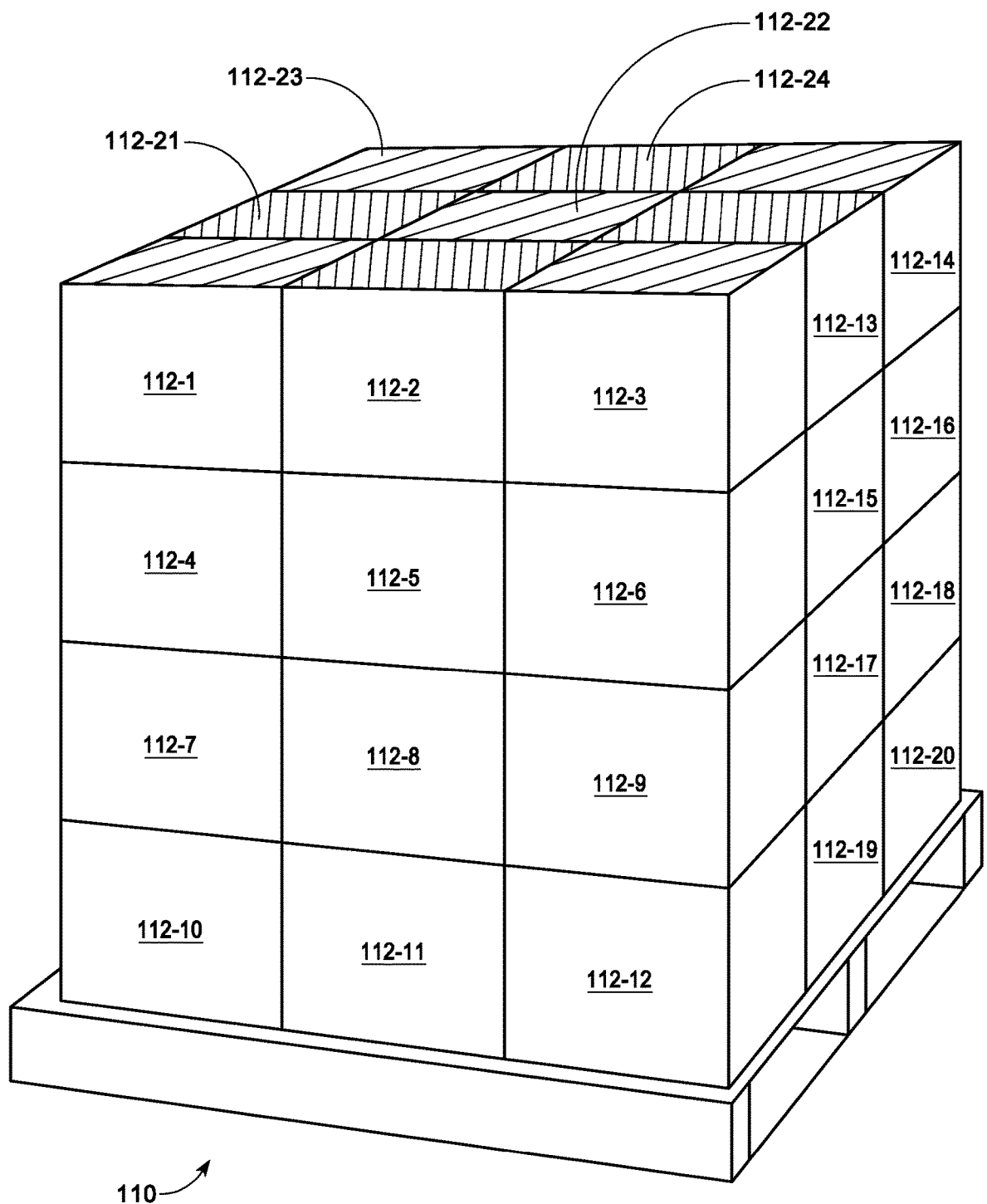
FIG. 3A illustrates a perspective view of an example stack of packages.

FIGS. 3A through 4Q, illustrate how the robotic system 100 of FIGS. 1A and 1B may be employed to create the registration record 172 of FIG. 1B of the unregistered instance of the package 112 of FIG. 1A. FIG. 3A illustrates a perspective view of an example stack of packages 112-1 through 112-24. FIG. 3B illustrates a top view the example stack of these packages 112. FIG. 3B can correspond to an image and/or point cloud data of the scene looking down on these packages 112 as captured by the sensors 162 of the image system 160 of FIGS. 1A and 1B. For the sole purpose of illustration and not of limitation, the packages 112-1 through 112-3, 112-13 through 112-14, and 112-21 through 112-24 can represent registered instances of the packages 112, each having the registration record 172 stored in the RDS 170 of FIG. 1B. For the sake of discussion and brevity only, the packages 112 are shown as being rectangular in shape, and each having a SI (shown as diagonal lines) that is registered in a respective registration record 172.

Figure 3B:
FIG. 3B illustrates a top view of the example stack of packages.
Figure 3B:
Figure 3B:
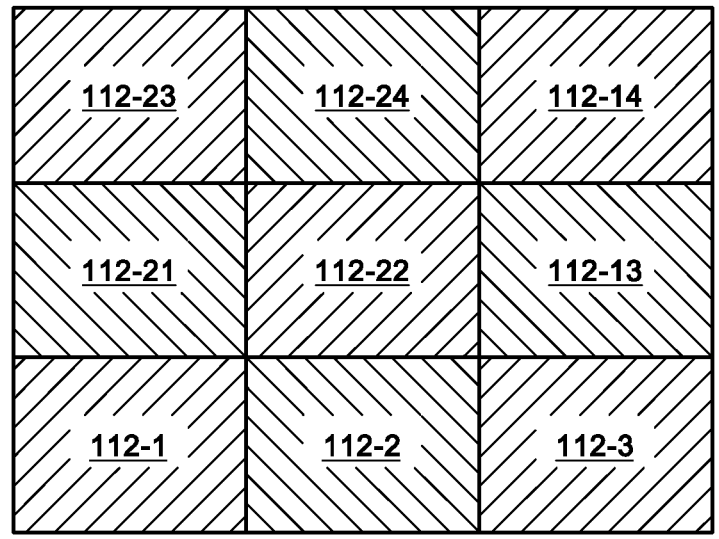
Figure 3C:
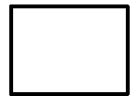
FIG. 3C illustrates example symbologies of registered packages in accordance with some embodiments of the present technology.
Figure 3C:
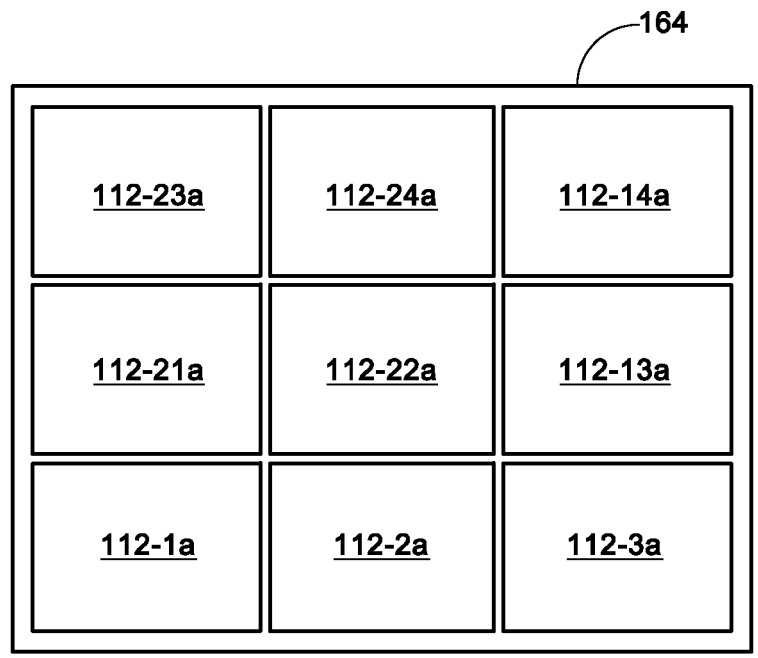

FIG. 3C illustrates example symbologies of registered packages in accordance with some embodiments of the present technology. FIG. 3C illustrates the package symbologies (e.g., visual markers and/or overlays for representing registration status of displayed objects) 112-1*a* through 112-3*a*, 112-13*a* through 112-14*a*, and 112-21*a* through 112-24*a* as shown by the display unit 164 of FIG. 1B. To produce these symbologies and the corresponding registration status, the captured SIs of the packages 112-1 through 112-3, 112-13 through 112-14, and 112-21 through 112-24 of FIG. 3B may be compared with the SIs of the registration records 172 stored in the RDS 170 with image recognition algorithm(s), and if registered, displayed as the symbology. In some embodiments, the symbology could be configured by a manufacturer and/or end-user with a visual format indicative of the SI being registered, where such format could employ an assortment of shapes and/or colors. For the purpose of illustration and not of limitation, a manufacturer and/or end-user has configured symbologies 112-1*a* through 112-3*a*, 112-13*a* through 112-14*a*, and 112-21*a* through 112-24*a* to be the shape and size of package outlines (i.e., assumed here as rectangular). Although not shown, the symbology could be color (e.g., green) indicative of a favorable registration status (i.e., existent instance of the registration records 172) for each of the packages 112-1 through 112-3, 112-13 through 112-14, and 112-21 through 112-24. Although not shown, the image of the scene shown in FIG. 3B could be presented on the display unit 164 over which the symbology of FIG. 3C may be overlaid. In some embodiments, alphanumeric characters informative of the packages 112-1 through 112-3, 112-13 through 112-14, and 112-21 through 112-24 (e.g., one or more physical characteristics listed in the registration record 172) may be presented instead of or in addition to the symbology.

In some embodiments, the robotic system 100 can make 2-D measurements (e.g., lengths and widths) of packages from the image data (through image recognition algorithm (s) that could include edge detection algorithm(s). For example, the robotic system 100 can use image recognition algorithm(s) (e.g., edge detection algorithm(s) and/or mapping algorithm(s)) to make the 2-D measurements of the packages 112 at the de-palletizing platform 110, such as the packages 112-1 through 112-3, 112-13 through 112-14, and 112-21 through 112-24. The robotic system 100 can make the 2-D measurements based on depth to the measured surface. The robotic system 100 can compare (e.g., once the measured package is identified, such as via image recognition of its exposed surface) the 2-D measurements of the corresponding package 112 to their registration records 172 to confirm the accuracy of the registration records 172.

In some embodiments, CoM information stored in the registration record 172 may be provided to the PU 150 for the purpose of positioning the end effector 140 and/or the gripper system 146 of FIGS. 1A and 1B. The robotic system 100 can place the end effector 140 and/or the gripper system 146 over the CoM of the package 112 to grab and lift the package 112, thereby facilitating operations involving balanced package gripping and level package lifting when package 112 is gripped and lifted from its position on the de-palletizing platform 110 of FIG. 1A. The packages 112 may be grabbed, lifted, transported to, and released at the receiving platform 120 of FIG. 1A.

Figure 4A:
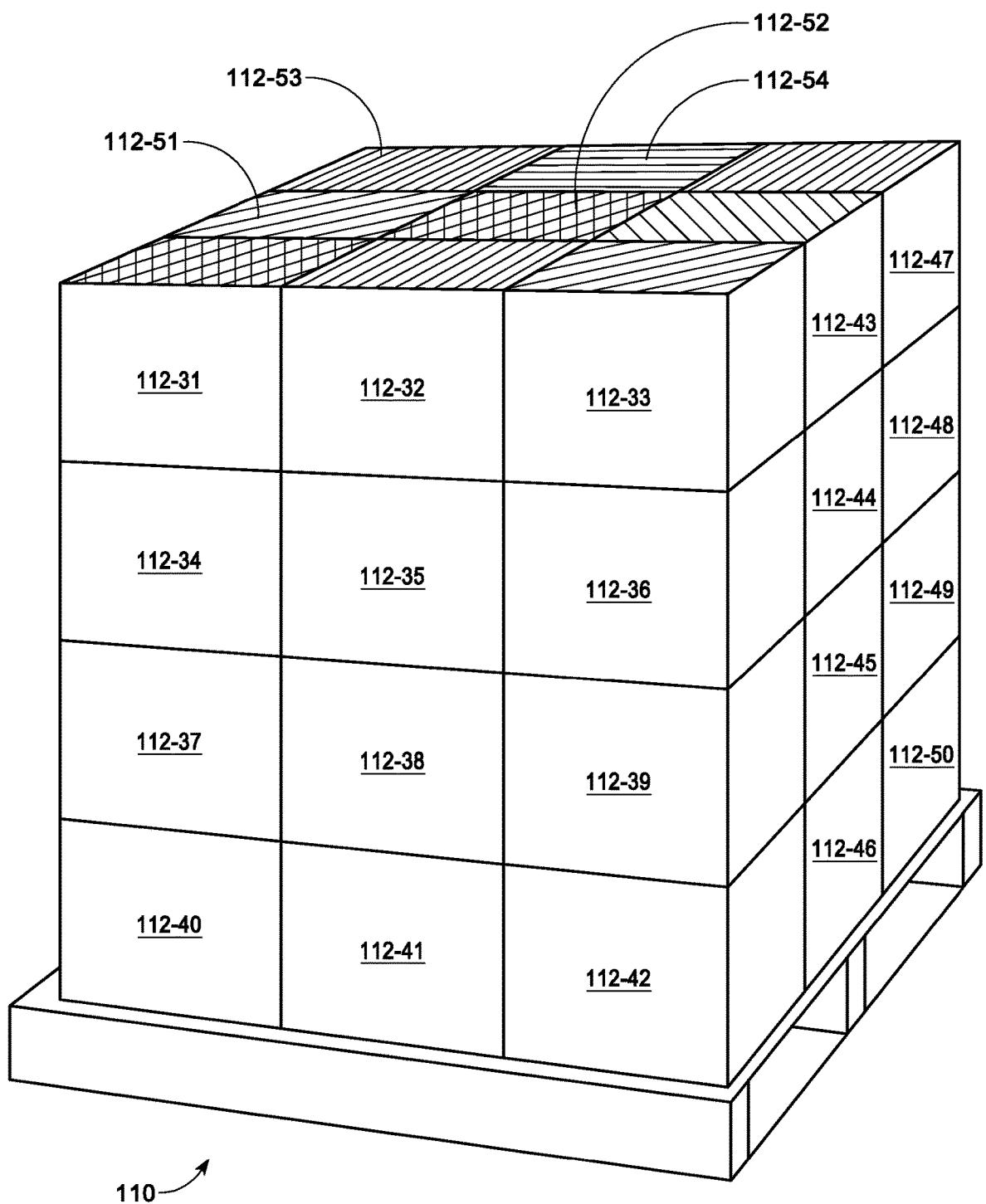
FIG. 4A illustrates a perspective view of a second example stack of packages in accordance with some embodiments of the present technology.
Figure 4B:
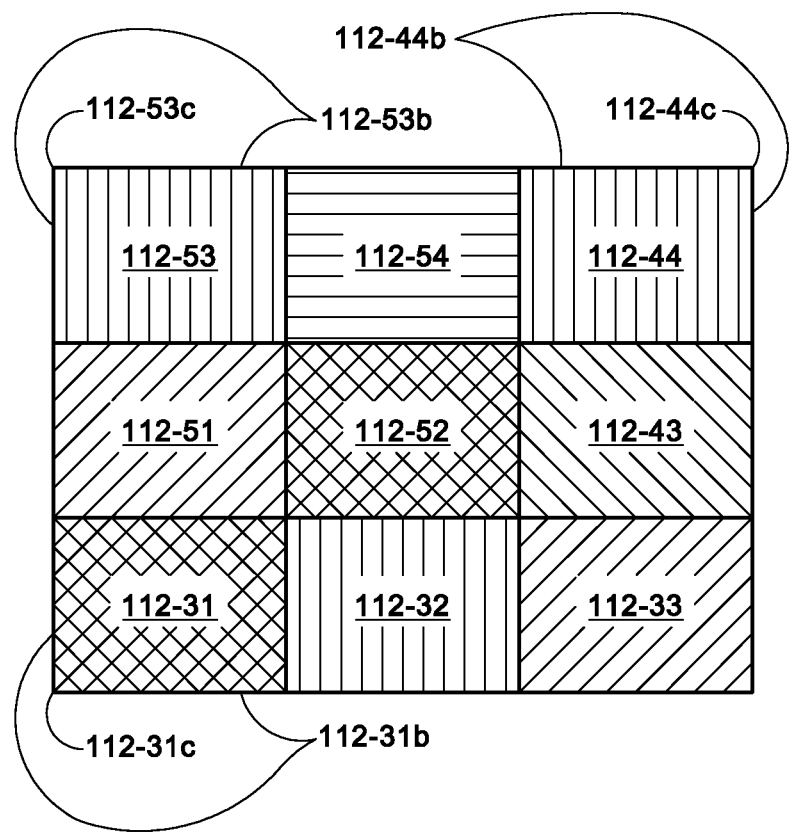
FIG. 4B illustrates a top view of the second stack of packages in accordance with some embodiments of the present technology.

FIG. 4A illustrates a perspective view of a second example stack of packages (e.g., packages 112-31 through 112-54) in accordance with some embodiments of the present technology. FIG. 4B illustrates of a top view of the second example stack of the packages in accordance with some embodiments of the present technology. FIG. 3B can correspond to an image and/or point cloud data of the scene of looking down on these packages as captured by the sensors 162 of the image system 160 of FIGS. 1A and 1B. For the sole purpose of illustration and not of limitation, the packages 112-33, 112-43 and 112-51 can represent registered instance of the packages 112, each instance having the SI included in the respective instance of the registration record 172 of FIG. 1B stored in the RDS 170 of FIG. 1B. For the sake of discussion and brevity only, the packages 112 are rectangular in shape.

In addition, the packages 112-31, 112-32, 112-44, and 112-52 through 112-54 can represent unregistered and/or erroneously processed/matched instances of the packages 112, which may not correspond to the registration record 172 stored in the RDS 170 of FIG. 1B. The robotic system 100 can use the captured image data representative of these unregistered/unmatched SIs as first image data and a registerable SI as discussed below. For the sake of discussion and brevity only, the packages 112 are rectangular in shape, and each can have a SI shown by vertical, horizontal, and/or cross-hatched lines.

Figure 4C:
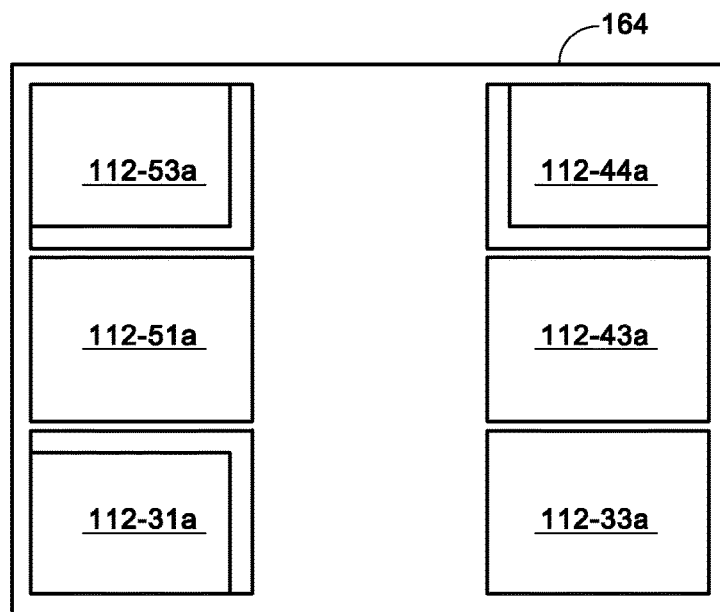
FIG. 4C illustrates example symbologies of registered and unregistered packages in accordance with some embodiments of the present technology.
Figure 4C:
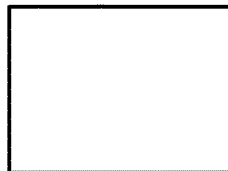
Figure 4C:
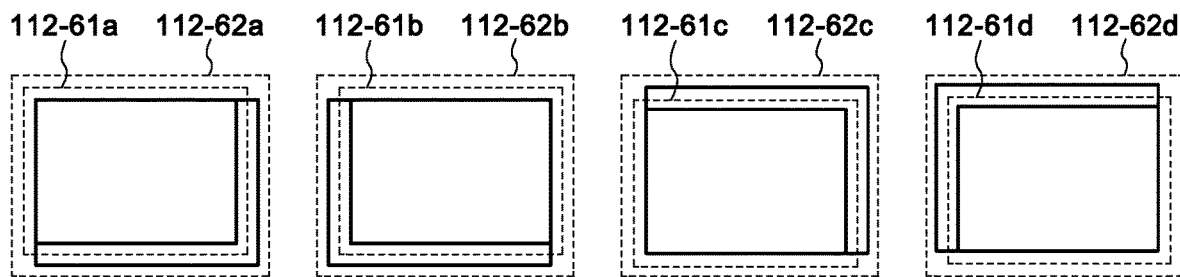

FIGS. 4C, 4E, 4G, 4I, and 4L can illustrate top views of the stack as one or more packages are removed. FIG. 4C illustrates example symbologies of registered and unregistered packages in accordance with some embodiments of the present technology. FIG. 4C illustrates the symbologies of rectangles 112-33*a*, 112-43*a*, and 112-51*a* as shown by the display unit 164 of FIG. 1B. As stated above, SIs for the packages 112 may be captured by the image system 160 of FIG. 1B and compared with the SIs of the registration records 172 of FIG. 1B stored in the RDS 170 of FIG. 1B. If registered, the robotic system can assign and/or display symbologies indicative of the SI being registered. As illustrated, symbologies 112-33*a*, 112-43*a*, and 112-51*a*, can include rectangular outlines displayed by the display unit 164.

As shown in FIG. 4C, a combination of inner rectangles 112-61*a* through 112-61*d*, inclusive, within outer rectangles 112-62*a* through 112-62*d*, inclusive, can be displayed as the symbologies 112-31*a*, 112-44*a*, and 112-53*a* for the unregistered SIs of the packages 112-31, 112-44, and 112-53 on the display unit 164. In some embodiments, the size and placement of the inner rectangles 112-61*a* through 112-61*d* can coincide with a minimum viable region (MVR) discussed in detail below. The presence of symbologies 112-

31*a*, 112-44*a*, and 112-53*a* could be indicative that the SIs of the packages 112-31, 112-44, and 112-53 do not have and/or match the registration records 172. In such instance, an image recognition algorithm(s) (e.g., an edge recognition algorithm(s)) can be employed to determine a presence of at least two clear edges forming a corner.

Figure 4D:
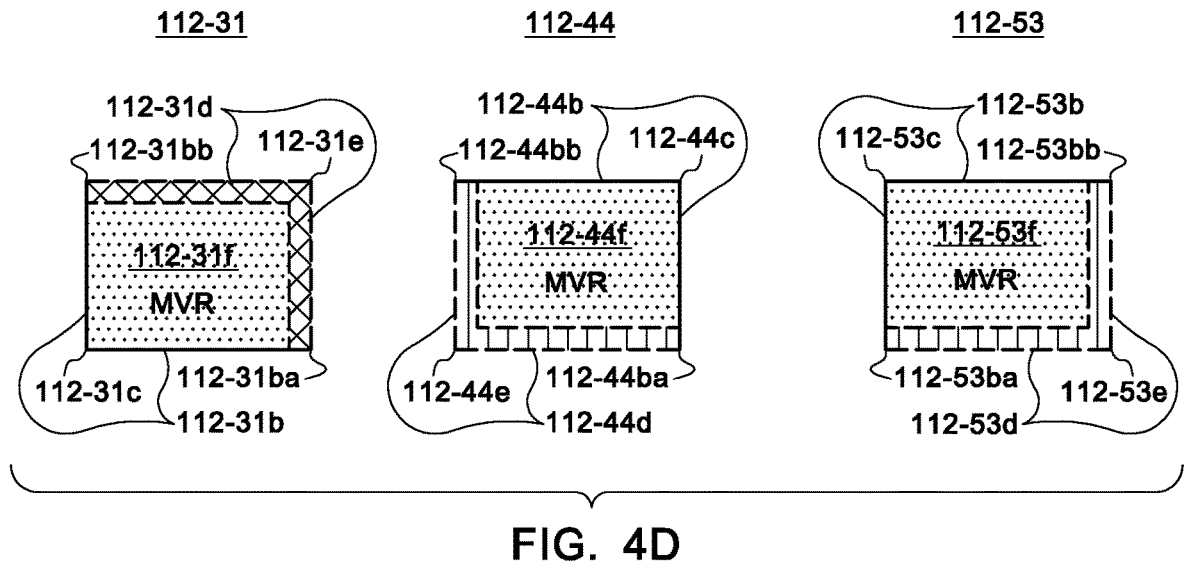
FIG. 4D illustrates examples of unclear edges and minimum viable regions (MVRs) in accordance with some embodiments of the present technology.

FIG. 4D illustrates examples of unclear edges and MVRs in accordance with some embodiments of the present technology. FIG. 4D illustrates two clear edges 112-31*b*, 112-44*b*, and 112-53*b* (e.g., edges that form/coincide with outer edges of the stack) forming corners 112-31*c*, 112-44*c*, and 112-53*c*, respectively, for the unregistered/unmatched packages. Also, two unclear edges 112-31*d*, 112-44*d*, and 112-53*d* may be identified/estimated by the PU 150 to form corners 112-31*e*, 112-44*e*, and 112-53*e*, respectively. In some embodiments, the two unclear edges 112-31*d* of the package 112-31 of FIG. 4A can be processed by assuming they extend at a predetermined angle (e.g., perpendicularly) from ends 112-31*ba* and 112-31*bb*, respectively, until intersecting at the corner 112-31*e*. Similarly, the two unclear edges 112-44*d* of package 112-44 can be processed by assuming they extend at a predetermined angle (e.g., perpendicularly) from ends 112-44*ba* and 112-44*bb*, respectively, until intersecting at the corner 112-44*e*. Likewise, the two unclear edges 112-53*d* of package 112-53 can be processed by assuming they extend at a predetermined angle (e.g., perpendicularly) from ends 112-53*ba* and 112-53*bb*, respectively, until intersecting at the corner 112-53*e*. In some embodiments, the robotic system 100 can select or adjust the predetermined angle according to a depth measurement, a position/location, a determined pose, or a combination thereof associated with the corresponding package.

In addition, example MVRs 112-31*f*, 112-44*f*, and 112-53*f* are illustrated in FIG. 4D. In some embodiments, the MVRs may be calculated for each unregistered instance of the package 112, which can be used to create the registration record 172 of FIG. 1B. The robotic system 100 can create the registration record 172 as a function of its respective MVR. MVR 112-31*f* can be computed so that its sides are collinear with the two clear edges 112-31*b* or portions thereof. In other words, the size of the MVR 112-31*f* can be smaller than the surface of the package 112-31. In some embodiments, the MVR 112-31*f* can be sized as a function of the size of the gripper system 146 shown in FIG. 2B or other characteristics corresponding to the ability to grab and safely sustain the grab as the package 112 is lifted. In processing the MVR, the robotic system 100 can assume and use a default CoM for the package 112. Accordingly, using the default CoM and the calculated size, the robotic system 100 can calculate the MVR 112-31*f* that prevents errors/failures in associated manipulations (e.g., grip, lift, and/or transport) of the packages 112. For example, when the MVR is too small, the gripper system 146 may be misplaced and a sustained grab by the gripper system 146 may not be possible when the package 112 is lifted. In some embodiments, the MVR 112-31*f* can be sized to exclude straight lines that are part of the surface designs and/or markings appearing in the SI as determined by an image recognition algorithm(s). In some embodiments, the MVR 112-31*f* can be sized to exclude edges corresponding to lower confidence measure. It should be noted that, although the preceding discussion has been drawn towards MVR 112-31*f*, the function for calculating the MVR 112-31*f* applies to any MVR discussed herein.

Figure 4E:
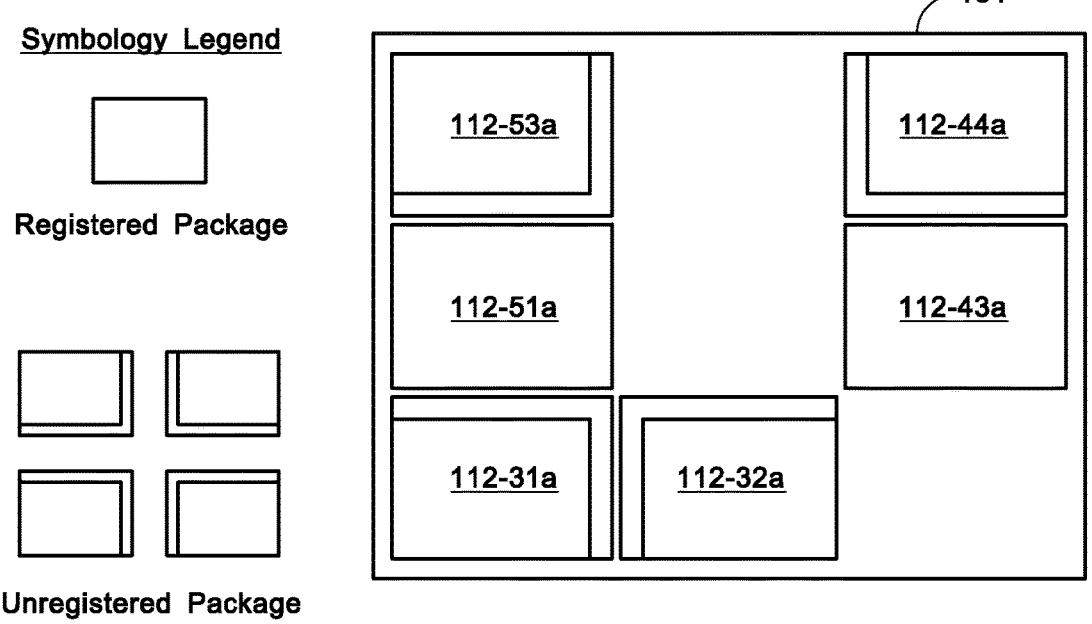
FIG. 4E illustrates a second set of example symbologies of registered and unregistered packages in accordance with some embodiments of the present technology.

FIG. 4E illustrates a second set of example symbologies of registered and unregistered packages in accordance with some embodiments of the present technology. FIG. 4E can represent a state of the stack of packages after one or more packages have been removed/transported from the stack shown in FIG. 4C. The lack of symbology 112-33*a* of FIG. 4C can indicate registered package 112-33 having been grabbed, lifted, and transported away from the de-palletizing platform 110 of FIG. 1A. Also, the robotic system 100 can generate/display symbology 112-32*a* on the display unit 164, indicating a new recognition of two clear edges (e.g., edges that are now exposed and no longer adjacent to any abutting edges/packages) forming a corner for package 112-32 shown in FIG. 4B.

Figure 4G:
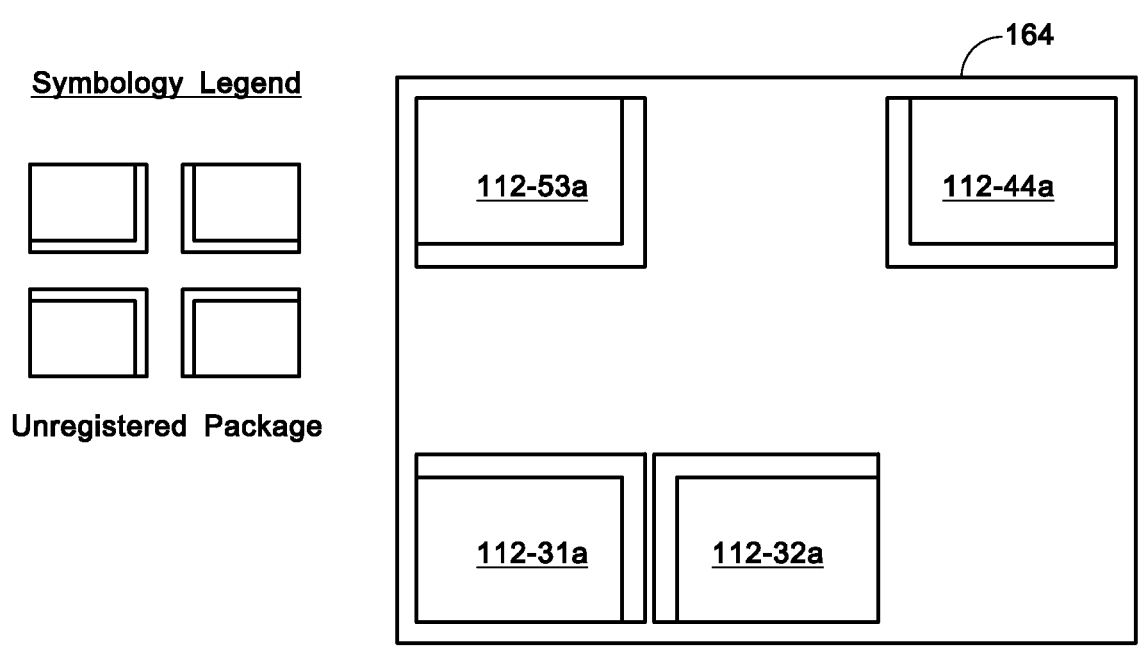
FIG. 4G illustrates a third set of example symbologies of unregistered packages in accordance with some embodiments of the present technology.
Figure 4F:
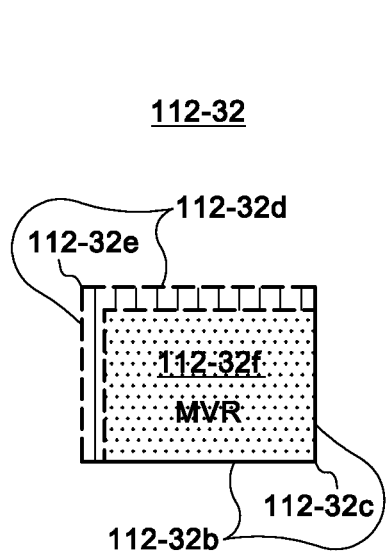
FIG. 4F illustrates a second example of unclear edges and an MVR in accordance with some embodiments of the present technology.

FIG. 4F illustrates a second example of unclear edges and an MVR in accordance with some embodiments of the present technology. FIG. 4F illustrates clear edges 112-32*b* forming a corner 112-32*c* that have been recognized using one or more processes described above. From this recognition, two unclear edges 112-32*d* and corresponding corner 112-32*e* may be estimated by the robotic system 100 (e.g., the PU 150) in the manner discussed above, and an MVR 112-32*f* may be computed in the manner discussed above.

FIG. 4G illustrates a third set of example symbologies of unregistered packages in accordance with some embodiments of the present technology. FIG. 4G can represent a state of the stack of packages after one or more packages have been removed/transported from the stack shown in FIG. 4E. The lack of symbologies 112-43*a* and 112-51*a* of FIGS. 4C and 4E can indicate registered packages 112-43 and 112-51 having been grabbed, lifted, and transported away from the de-palletizing platform 110 of FIG. 1. It should be noted that, while right and left edges for package 112-52 of FIG. 4B may now be recognized (e.g., as they are exposed and no longer adjacent to abutting edges/packages), these edges are parallel to each other and not intersecting to form a corner; as such, an addition of symbology corresponding to package 112-52 may not displayed by display unit 164 in some embodiments.

Figure 4H:
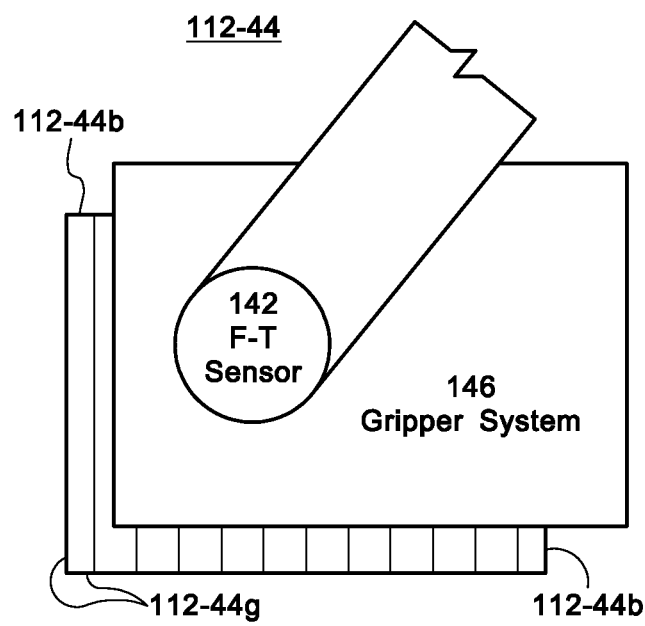
FIG. 4H illustrates an example placement of a gripper system over a first MVR of FIG. 4D in accordance with some embodiments of the present technology.

FIG. 4H illustrates an example placement of a gripper system (e.g., the gripper system 146) over a MVR (e.g., the MVR 112-44*f* of FIG. 4D) in accordance with some embodiments of the present technology. The F-T sensor 142 and the gripper system 146 comprising the end effector 140 of FIGS. 1A and 1B may be positioned so that the gripper system 146 is placed over the MVR 112-44*f* without blocking the unclear edges 112-44*d* of FIG. 4D from view of the sensors 162 of the image system 160 of FIG. 1. Then, the package 112-44 could be grabbed and lifted vertically for a lift check distance to a raised position. For example, the lift check distance can represent a distance that is sufficient for the F-T sensor 142 of FIGS. 1B and 2A to capture measurements of one or more axis forces and/or axis moments of the package 112-44. For example, the lift check distance can represent a vertical distance or distance along the z-axis that is greater than zero millimeter. For a specific example, the lift check distance can represent 50 millimeters.

In some embodiments with reference made to the Cartesian coordinate system, force measurement(s) along one or more axis (i.e., F(x-axis), F(y-axis), and/or F(z-axis)) and/or moment measurement(s) about one or more axis (i.e., M(x-axis), M(y-axis), and/or M(z-axis)) may be captured via the F-T sensor 142. By applying CoM calculation algorithms, the weight of the package may be computed as a function of the force measurement(s), and the CoM of the package may be computed as a function of the force measurement(s) and the moment measurement(s). These measurements can be added to a new instance of the registration record 172 of FIG. 1B being created for the package 112-44. In some embodiments, if the computed CoM falls outside of the MVR 112-44*f*; the package 112-44 may be released from the gripper system 146. Then, the gripper system 146 may be positioned over the computed CoM, at which time the package 112-44 may be safely gripped and lifted to the raised position again.

While in the raised position, the robotic system can reimage the lifted package to clarify the previously unclear edges. Second image data representative of a partial SI of 112-44 (i.e., the portion of the entire SI that is not blocked by the gripper system 146) may be captured by the sensors 162 of the image system 160 of FIGS. 1A and 1B to acquire clear edges 112-44*g* of the unclear edges 112-44*d* of FIG. 4D. In some embodiments, depth information represented in the first image data comprised of first point cloud data may be compared with depth information represented in the second image data comprised of second point cloud data to determine a change of depth information from which clear edges and 2-D measurements may be determined. Once acquired, third image data representative of a registerable SI may be generated from the SI of the first image data and the clear edges of the second image data. The 2-D measurements determined from the second image data and the registerable SI of the third image data may now be added to the registration record 172 being created for the package 112-44. For a further example, the third image data can represent a template image data for the robotic system 100 of FIG. 1A. From here, a new instance of the registration record 172 comprised of the registerable SI, the 2-D measurements, and the measurements of weight and CoM for the unregistered instance of the package 112-44 may now be stored in the RDS 170 of FIG. 1B. The robotic system 100 can determine whether the package 112 is unregistered or not by comparing the SI of the package 112 to the template image data.

Figure 4I:
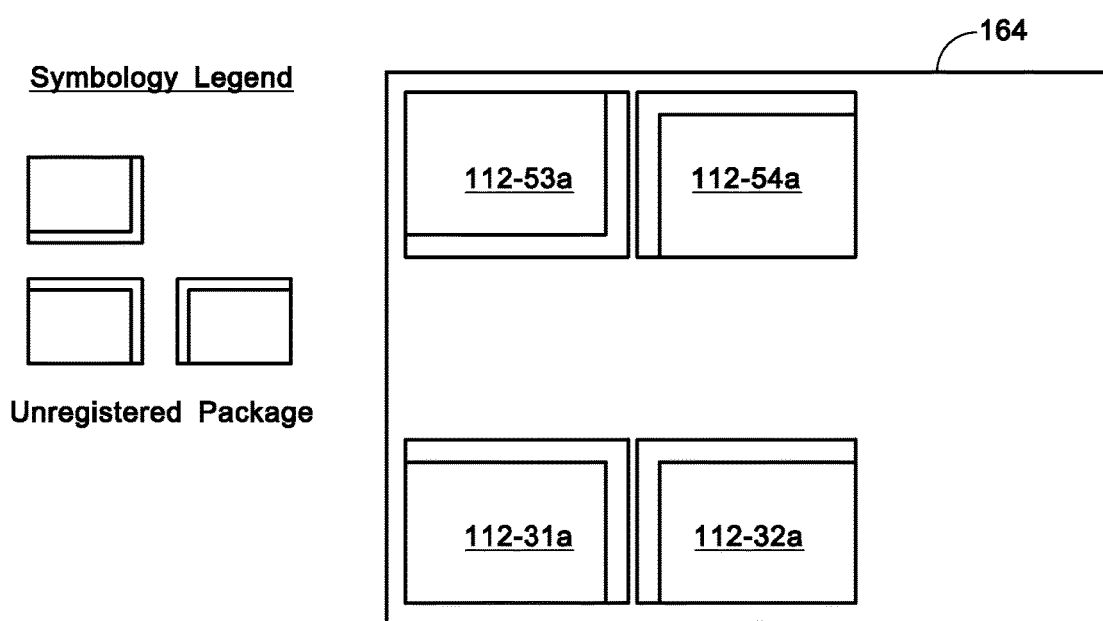
FIG. 4I illustrates a fourth set of example symbologies of unregistered packages in accordance with some embodiments of the present technology.

FIG. 4I illustrates a fourth set of example symbologies of unregistered packages in accordance with some embodiments of the present technology. FIG. 4I can represent a state of the stack of packages after one or more packages have been removed/transported from the stack shown in FIG. 4G. The lack of symbology 112-44*a* of FIGS. 4C, 4E, and 4G can indicate that, after a new instance of the registration record 172 was established, the formerly unregistered instance of the package 112-44 has been transported away from the de-palletizing platform 110. Also, the robotic system 100 can generate/display symbology 112-54*a* on the display unit 164, indicating a new recognition of two clear edges (e.g., newly exposed edges after removal/transport of the previously adjacent package(s)) forming a corner for package 112-54 shown in FIG. 4B.

Figures 4J, 4K:
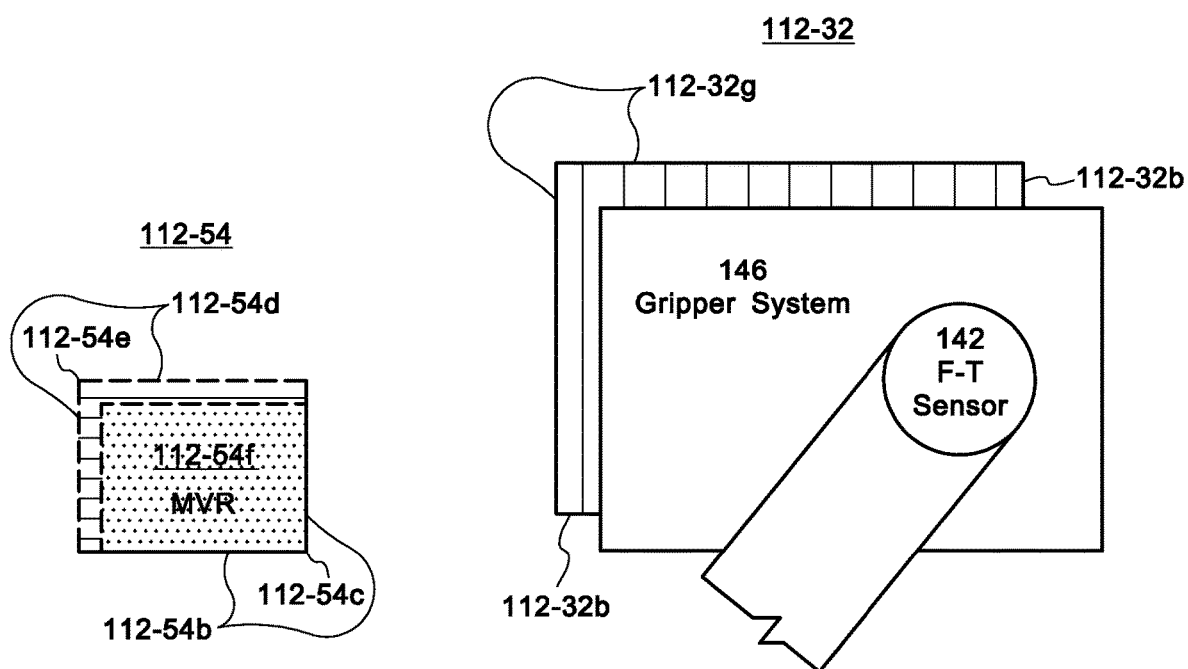
FIG. 4J illustrates an example of unclear edges and an MVR for a newly processed package in accordance with some embodiments of the present technology.
FIG. 4K illustrates an example placement of a gripper system over the MVR of FIG. 4F in accordance with some embodiments of the present technology.

FIG. 4J illustrates an example of unclear edges and an MVR for newly processed package (e.g., the package 112-54). FIG. 4J illustrates clear edges 112-54*b* forming a corner 112-54*c* that have been recognized using one or more processes described above. From this recognition, two unclear edges 112-54*d* and corresponding corner 112-54*e* may be estimated by the robotic system 100 (e.g., the PU 150) in the manner discussed above, and an MVR 112-54*f* may be computed in the manner discussed above.

FIG. 4K illustrates an example placement of a gripper system (e.g., the gripper system 146) over the MVR of FIG. 4F (e.g., the MVR 112-32*f*) in accordance with some embodiments of the present technology. The F-T sensor 142 and the gripper system 146 comprising the end effector 140 of FIGS. 1A and 1B may be positioned so that the gripper system 146 is placed over the MVR 112-32*f* without blocking the unclear edges 112-32*d* from view of the sensors 162 of the image system 160 of FIG. 1. Then, with the package 112-32 in a raised position and in the manner discussed above, weight and CoM measurements may be determined and added to a new instance of the registration record 172 being created for the package 112-32; second image data representative of a partial SI of the package 112-32 may be captured from which 2-D measurements and clear edges 112-32*g* may be determined; and third image data representative of a registerable SI may be generated from the SI of the first image data and the clear edges of the second image data. From here, a new instance of the registration record 172 comprised of the registerable SI, the 2-D measurements, and the measurements of weight and CoM for the unregistered instance of the package 112-32 may now be stored in the RDS 170 of FIG. 1B.

FIG. 4L illustrates a fifth set of example symbologies of unregistered packages in accordance with some embodiments of the present technology. FIG. 4L can represent a state of the stack of packages after one or more packages have been removed/transported from the stack shown in FIG. 4I. The lack of symbology 112-32*a* of FIGS. 4E, 4G, and 4I can indicate that, after a new instance of the registration record 172 was established, the formerly unregistered instance of the package 112-32 has been transported away from the de-palletizing platform 110. Also, the robotic system 100 can generate/display symbology 112-52*a* on the display unit 164, indicating a new recognition of two clear edges (e.g., newly exposed edges after removal/transport of the previously adjacent package(s)) forming a corner for the package 112-52 shown in FIG. 4B.

FIG. 4M illustrates an example of unclear edges and an MVR for a newly processed package (e.g., the package 112-52). FIG. 4M illustrates clear edges 112-52*b* forming a corner 112-52*c* that have been recognized using one or more processes described above. From this recognition, two unclear edges 112-52*d* and corresponding corner 112-52*e* may be estimated by the robotic system 100 (e.g., the PU 150) in the manner discussed above, and an MVR 112-52*f* may be computed in the manner discussed above.

FIG. 4N illustrates an example placement of a gripper system (e.g., the gripper system 146) over the MVR of FIG. 4M (e.g., the MVR 112-52*f*) in accordance with some embodiments of the present technology. The F-T sensor 142 and the gripper system 146 comprising the end effector 140 of FIGS. 1A and 1B may be positioned so that the gripper system 146 is placed over the MVR 112-52*f* without blocking the unclear edges 112-52*d* from view of the sensors 162 of the image system 160 of FIG. 1. Then, with the package 112-52 in a raised position and in the manner discussed above, weight and CoM measurements may be determined and added to a new instance of the registration record 172 being created for the package 112-52; second image data representative of a partial SI of the package 112-52 may be captured from which 2-D measurements and clear edges 112-52*g* may be determined; and third image data representative of a registerable SI may be generated from the SI of the first image data and the clear edges of the second image data. From here, a new instance of the registration record 172 comprised of the registerable SI, the 2-D measurements, and the measurements of weight and CoM for unregistered instance of the package 112-52 may now be stored in the RDS 170 of FIG. 1B.

Figure 4O:
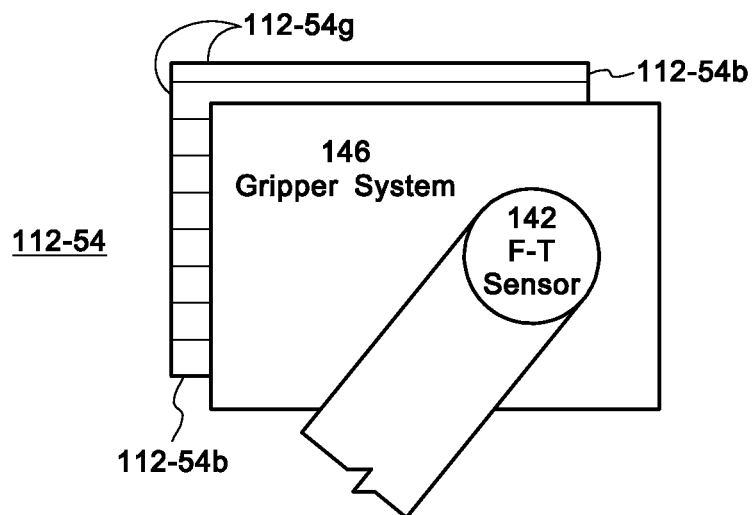
FIG. 4O illustrates an example placement of a gripper system over the MVR of FIG. 4J in accordance with some embodiments of the present technology.

FIG. 4O illustrates an example placement of a gripper system (e.g., the gripper system 146) over the MVR of FIG. 4J (e.g., the MVR 112-54*f*) in accordance with some embodiments of the present technology. The F-T sensor 142 and the gripper system 146 comprising the end effector 140 of FIGS. 1A and 1B may be positioned so that the gripper system 146 is placed over the MVR 112-54*f* without blocking the unclear edges 112-54*d* from view of the sensors 162 of the image system 160 of FIG. 1. Then, with package 112-54 in a raised position and in the manner discussed above, weight and CoM measurements may be determined and added to a new instance of the registration record 172 being created for the package 112-54; second image data representative of a partial SI of package 112-54 may be captured from which 2-D measurements and clear edges 112-54*g* may be determined; and third image data representative of a registerable SI may be generated from the SI of the first image data and the clear edges of the second image data. From here, a new instance of the registration record 172 comprised of the registerable SI, the 2-D measurements, and the measurements of weight and CoM for unregistered instance of the package 112-54 may now be stored in the RDS 170 of FIG. 1B.

Figure 4P:
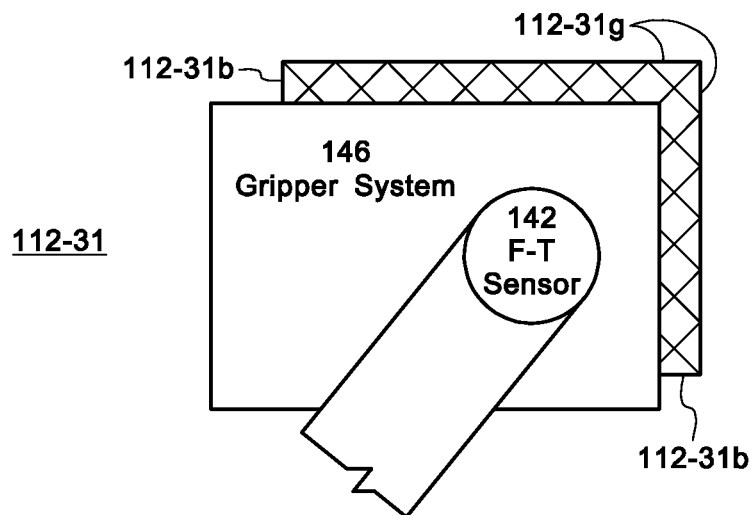
FIG. 4P illustrates an example placement of a gripper system over a second MVR of FIG. 4D in accordance with some embodiments of the present technology.

FIG. 4P illustrates an example placement of a gripper system (e.g., the gripper system 146) over a second MVR of FIG. 4D (e.g., the MVR 112-31*f*) in accordance with some embodiments of the present technology. The F-T sensor 142 and the gripper system 146 comprising the end effector 140 of FIGS. 1A and 1B may be positioned so that the gripper system 146 is placed over the MVR 112-31*f* without blocking the unclear edges 112-31*d* from view of the sensors 162 of the image system 160 of FIG. 1. Then, with the package 112-31 in a raised position and in the manner discussed above, weight and CoM measurements may be determined and added to a new instance of the registration record 172 being created for the package 112-31; second image data representative of a partial SI of package 112-31 may be captured from which 2-D measurements and clear edges 112-31*g* may be determined; and third image data representative of a registerable SI may be generated from the SI of the first image data and the clear edges of the second image data. From here, a new instance of the registration record 172 comprised of the registerable SI, the 2-D measurements, and the measurements of weight and CoM for unregistered package 112-31 may now be stored in the RDS 170 of FIG. 1B.

Figure 4Q:
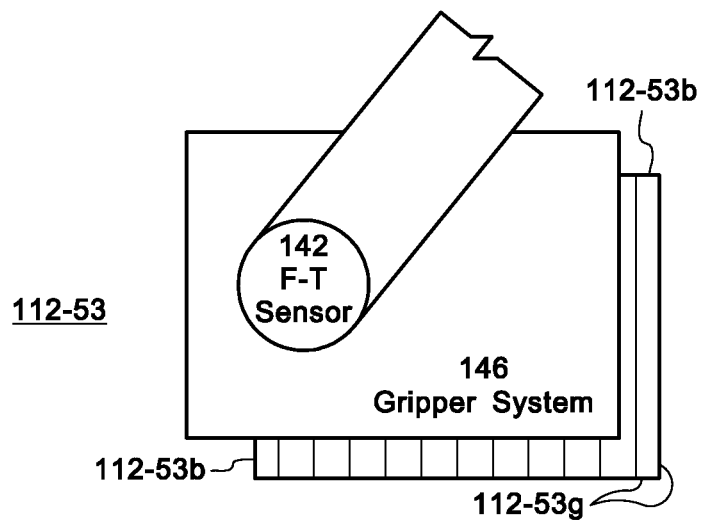
FIG. 4Q illustrates an example placement of a gripper system over a third MVR of FIG. 4D in accordance with some embodiments of the present technology.

FIG. 4Q illustrates an example placement of a gripper system (e.g., the gripper system 146) over a third MVR of FIG. 4D (e.g., the MVR 112-53) in accordance with some embodiments of the present technology. The F-T sensor 142 and the gripper system 146 comprising the end effector 140 of FIGS. 1A and 1B may be positioned so that the gripper system 146 is placed over the MVR 112-53*f* without blocking the unclear edges 112-53*d* from view of the sensors 162 of the image system 160 of FIG. 1. Then, with the package 112-53 in a raised position and in the manner discussed above, weight and CoM measurements may be determined and added to a new instance of the registration record 172 being created for the package 112-53; second image data representative of a partial SI of package 112-53 may be captured from which 2-D measurements and clear edges 112-53*g* may be determined; and third image data representative of a registerable SI may be generated from the SI of the first image data and the clear edges of the second image data. From here, a new instance of the registration record 172 comprised of the registerable SI, the 2-D measurements, and the measurements of weight and CoM for unregistered instance of the package 112-53 may now be stored in the RDS 170 of FIG. 1B.

Figure 5:
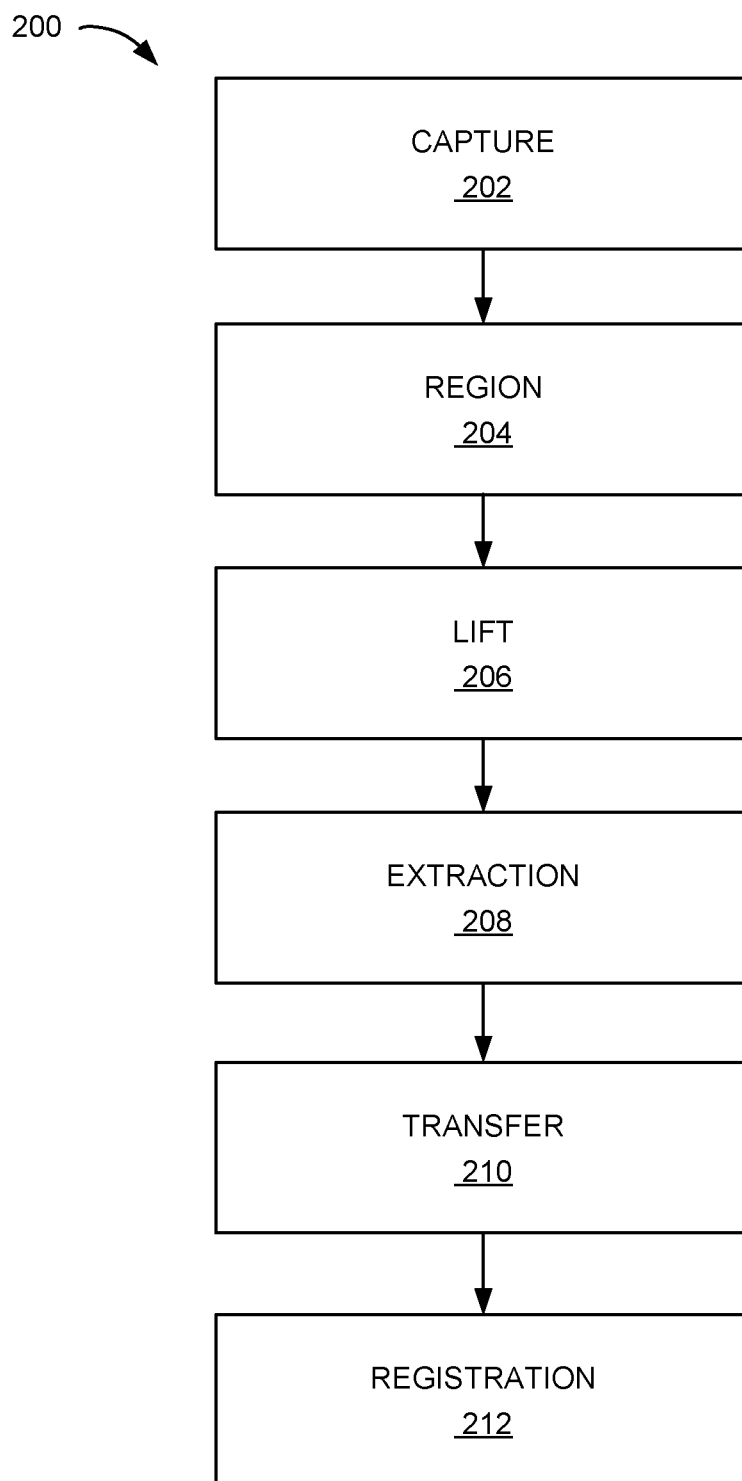
FIG. 5 illustrates a control flow for an example method for operating the robotic system 100 of FIG. 1A in accordance with some embodiments of the present technology.

FIG. 5 illustrates a control flow 200 for an example method for operating the robotic system 100 of FIG. 1A. The control flow 200 can include registering an unregistered of the package 112 during a package handling operation, where the PU 150 of FIG. 1B may be programmed or configured with instructions corresponding to the modules (e.g., circuits, functions, computer/device-executable instructions, or a combination thereof) embodied in the control flow 200. In some embodiments, the PU 150 may be a processor or a combination of processors found in the robotic arm system 130 of FIG. 1B, the end effector 140 of FIG. 1B, the image system 160 of FIG. 1B, the RDS 170 of FIG. 1B, a stand-alone controller, and/or any other system suitable for performing the task. Also, the PU 150 may be a processor of a module such as, but not limited to, a printed circuit card having one or more input interfaces to facilitate the two-way data communications of the PU 130, i.e., the receiving and providing of data. As necessary for the accomplishment of the following modules embodied in the control flow 200, the receiving of data is synonymous and/or interchangeable with the acquiring and/or retrieving of data, and the providing of data is synonymous and/or interchangeable with the making available or supplying of data.

The robotic system 100 can include a capture module 202. The capture module 202 captures the SI as the first image data. For example, the capture module 202 can capture the first image data with the sensor(s) 162 of FIG. 1B. More specifically as an example, the capture module 202 can operate the image system 160 and/or interact with the image system 160 to capture and/or receive from the image system 160 the imaging data corresponding to a top view of a stack as illustrated in FIG. 3B and/or FIG. 4B. The capture module 202 can process the resulting imaging data to capture the top surface of the package 112 of FIG. 1A as the first image data. In some embodiments, the capture module 202 can employ one or more image recognition algorithms (e.g., the contextual image classification, pattern recognition, and/or edge detection) to analyze the imaging data and identify edges and/or surfaces of the packages 112 therein. Based on the processing results (e.g., the identified edges and/or continuous surfaces), the capture module 202 can identify portions (e.g., sets of pixels values and/or depth readings) of the imaging data as representing top surfaces of individual packages. The capture module 202 can transmit the first image data corresponding to the top surface(s) of one or more of the individual packages to a region module 204.

The robotic system 100 can include the region module 204, which can be coupled to the capture module 202. The region module 204 calculates the MVR. For example, the region module 204 can calculate the MVR based on the package 112, the registration record 172 of FIG. 1B, or a combination thereof.

In some embodiments, the capture module 202 can compare the received image data (e.g., the first image data) to the registration record 172. For example, the capture module 202 can compare the first image data and/or any processing results thereof (e.g., dimension/size estimates and/or visual markings derived from the image data) to existing descriptions/templates of known or previously encountered packages. Based on the comparison, the region module 204 can determine whether the first image data matches corresponding information of a known or previously encountered package as stored in the registration records 172.

The region module 204 can calculate the MVR in a number of ways, including, for example, calculating the MVR based on whether the package 112 is registered as the registration record 172 (e.g., whether comparison of the first image data to the registration records 172 returns a match). More specifically as an example, if the first image data matches one of the registration records 172 (e.g., the package 112 is registered as one or more of the registration records 172), the region module 204 can avoid calculating the MVR. In contrast, the region module 204 can calculate the MVR when first image data does not match to any of the registration records 172. For example, the first image data captured can represent the top surface of the unregistered instance of the package 112. Since the package 112 is unregistered, some instance of the edge of the package 112 can be unclear. More specifically as an example, the unregistered package 112-31 of FIG. 4B can include unclear edges 112-31*d* of FIG. 4D. The region module 204 can identify a set of clear and/or unclear edges. In some embodiments, the region module 204 can identify the clear edges (e.g., edges forming/coincident with peripheral edges of the stack and not abutting any other packages) and use them as references. Accordingly, the region module 204 can use the clear edges to determine the MVR as described above (e.g., according to a size/characteristic of the gripper system 146). The region module 204 can determine the MVR that is smaller than the area of the surface of the package 112 captured in the first image data.

For a specific example, the first image data of the package 112-31 can include two clear edges 112-31*b* of FIG. 4D. The region module 204 can predict the boundary of the surface area of the package 112-31 by extending the two clear edges 112-31*b* and the two unclear edges 112-31*d* so that the two clear edges 112-31*b* intersect with the two unclear edges 112-31*d*. The region module 204 can calculate the MVR based on the boundary of the surface area by determining the MVR to be smaller than the boundary of the surface area. In some embodiments, the region module 204 can identify (e.g., based on the image data) a pair of edges (e.g., clear and/or unclear edges) for the package surface that intersect each other to form a first corner. The region module 204 can use the pair of edges to determine the MVR, such as by estimating unclear edges via extending a pair of line perpendicular to the pair of edges and toward each other. Accordingly, the region module 204 can estimate an opposing corner as an intersect of the pair of unclear/extended pair lines. The region module 204 can extend the unclear/perpendicular lines from points on the first pair of edges that correspond to one or more sizes/characteristics of the gripper system 146.

For a further example, design and/or markings appearing on the SI of the package 112 can include a straight line. The straight line can be mistaken as the edge of the surface of the package 112. To reduce potential misidentification of the edge, the region module 204 can calculate the MVR excluding the portion of the surface with the straight line. More specifically as an example, the region module 204 can calculate the MVR smaller than the boundary of the surface area comprised with the straight line.

For a different example, the region module 204 can calculate the MVR based on the location of the package 112. For example, the pallet can include more than one packages 112 (registered and/or unregistered) as shown in FIG. 3A/FIG. 4B on the de-palletizing platform 110 of FIG. 1A. From the group of packages, the region module 204 can calculate the MVR based on a location of one instance of the package 112 relative to another instance of the package 112. As discussed, all of the edges of the registered instance of the package 112 can be known, such as based on positively matching the exposed surface of the package to registered data and using previously stored size/dimension measures that correspond to the registered data.

In contrast, some of the edges for the unregistered instance of the package 112 can be unknown, such as due to the package 112-52 being unregistered. Furthermore, an unknown package (e.g., the package 112-52) can be surrounded by other packages, such as the packages 112-31, 112-32, 112-33, 112-43, 112-44, 112-51, 112-53, and/or 112-54 as illustrated in FIG. 4B. Since the edges of the 112-52 are unknown, SI of the 112-52 can overlap with surface images of other packages 112.

In some instances, one or more of the surrounding packages (e.g., the package 112-32) can also be unregistered/unmatched according to the registration records 172, which can introduce further uncertainties about the remaining/unknown edges of the package 112-52. Without a clear boundary established between the package 112-52 and the package 112-32, the SI for the package 112-52 and the SI for the package 112-32 can overlap with each other.

In contrast, while the package 112-31 may also be unregistered/unmatched, the sensors 162 can detect a unique location/state of the package 112-31 relative to the de-palletizing platform 110 and/or other packages. For example, the region module 204 can determine that the package 112-31 satisfies a predetermined location/state when at least one edge of the package 112-31 is not adjacent to/abutting another package 112. More specifically as an example, the two edges 112-31*b* FIG. 4B and the corner 112-31*c* of FIG. 4B can be clearly visible in the first image and/or correspond to a depth measure (e.g., for a continuous surface) different (e.g., located above) than those at surrounding/adjacent horizontal locations. Also, for example, the region module 204 can determine that the package 112-31 and/or its outer edges correspond to a corner and/or an outer portion of the de-palletizing platform 110.

Accordingly, the region module 204 can determine the unregistered instance of the package 112 to be at or near the outer perimeter of the de-palletizing platform 110 based on the visibility of the edge(s), the corner, or a combination thereof of the package 112. In some embodiments, the region module 204 can further determine the unregistered instance of the package 112 to be exposed (e.g., not adjacent to other packages, such as due to removal of previously adjacent package) along one or more horizontal directions. The region module 204 can prioritize the calculation of the MVR for the unregistered instance of the package 112 that are exposed and/or at the exterior over other unregistered packages (e.g., the unregistered package 112-52 112 located at the horizontally interior portion of the stack/layer).

In some embodiments, the region module 204 can prioritize the calculation of the MVR for the package with the greater number of edges that are clearly visible and/or exposed over the package with fewer such edges. Accordingly, the robotic system 100 can reduce the risk of grasping the package with SI that overlaps with another package 112 and reduce the corresponding gripping/lifting failures. For the example illustrated in 4B, the region module 204 can determine the MVR for the package 112-31, 112-53, and/or 112-44 before the packages 112-32, 112-54 112-52. The region module 204 can transmit the MVR to a lift module 206.

The region module 204 can calculate the MVR based on two unclear corners. More specifically as an example, the two unclear corners can be comprised of a combination of at least three unclear edges, two clear edges and one unclear edge, or two unclear edges and one clear edge. As discussed above, the region module 204 can predict the boundary of the surface of the package 112 by extending each edge to intersect the other edge to create a corner. The region module 204 can calculate the MVR based on the boundary of the surface area created by the three edges/two corners by determining the MVR to be smaller than the boundary created by the two unclear corners.

The robotic system 100 calculating the MVR dynamically and in real-time provides improved accuracy and performance in grasping the unregistered instance of the package 112. By calculating the MVR, the robotic system 100 can estimate the surface area (e.g., the corresponding edges/boundaries) of the package 112 where the gripper system 146 of FIG. 4H can safely grasp the package 112. As a result, the robotic system 100 can transfer the package 112 unregistered to the robotic system 100 without stopping the workflow to improve the performance of the workflow for depalletizing the packages 112.

The robotic system 100 can include the lift module 206, which can be coupled to the region module 204. The lift module 206 implements (via, e.g., communicating and/or executing) the command for the robotic arm 132 of FIG. 1A to lift the package 112. For example, the lift module 206 can operate the robotic arm 132 to lift the unregistered instance of the package 112 for the lift check distance as discussed above. More specifically as an example, the robotic arm 132 can lift the package 112 by grasping within the MVR of the package 112 with the gripper system 146 where at least one of the edge that is unclear is visible to the sensors 162. In other words, for unregistered/unidentified packages, the lift module 206 can operate the robotic arm 132 to place the gripper system 146 directly on/over/contacting the MVR. As a result, the lift module 206 can grip and lift the corresponding package while leaving one or more unclear edges uncovered by the gripper system 146 and exposed/viewable by the sensors 162.

The lift module 206 can operate in a number of ways. For example, the lift module 206 can execute the lift command for the robotic arm 132 to grasp the package 112 within the MVR where the unclear edge is visible to the sensors 162. For a specific example, as shown in FIG. 4D, the robotic arm 132 can lift the package 112-44 of FIG. 4D within the 112-44*f* of FIG. 4D. The SI of the package 112-44 can include two clear edges 112-44*b* and the corner 112-44*c*. The SI of the package 112-44 can also include two unclear edges 112-44*d*. As shown in FIG. 4H, the robotic arm 132 can lift the package 112-44 by grasping the package 112-44 where the two unclear edges 112-44*b* are visible to the sensors 162 Without utilizing the MVR, the gripper system 146 may grip the package at a location that blocks the edge from being detectable by the sensors 162.

For a different example, the lift module 206 can determine the weight of the package 112. More specifically as an example, the lift module 206 can determine the weight of the unregistered instance of the package 112 using the F-T sensor 142 of FIG. 1B. The lift module 206 can transmit the weight of the package 112 to a registration module 212.

In some embodiments, the capture module 202 can further capture the SI of the unregistered instance of the package 112 after the lift and/or as it is being lifted by the grasp on the MVR as the second image data. More specifically as an example, the capture module 202 can capture the second image data based on the package 112 being lifted for the lift check distance to include the now visible two clear edges 112-44*g* of FIG. 4H. In other words, the lift module 206 can improve the visibility and/or clarity of the initially unclear edges by lifting the package 112. Accordingly, the capture module 202 can capture the second image data (e.g., for the package 112 in a lifted state/position) that clearly identifies/shows the previously unclear edges. The capture module 202 can transmit the second image data to an extraction module 208.

The robotic system 100 can include the extraction module 208, which can be coupled to the lift module 206. The extraction module 208 extracts the third image data. For example, the extraction module 208 can extract the third image data based on the first image data, the second image data, or a combination thereof.

The extraction module 208 can extract the third image data in a number of ways.

For example, the extraction module 208 can determine an image difference based comparing the first image data and the second image data. The image difference can represent the difference between the first image data and the second image data of the same instance of the unregistered instance of the package 112.

More specifically as an example, the first image data can include SI with the design and/or markings of the package 112. However, since the package 112 is unregistered, the edges of the package 112 can be unclear or not definitively determined. Thus, the first image data can include the SI of the package 112 with the edge that is unclear or overlapped with the SI of another package 112. For a further example, the second image data can include the SI of the package 112 after being lifted for the lift check distance. More specifically as an example, the second image data can include the SI of the package 112 with previously unclear edge (e.g., edges 112-44*b*) becoming clear edge (e.g., edges 112-44*g*) after the package 112 is lifted. The unclear edge can become clear edge after the package 112 is lifted because the package 112 becomes separate (e.g., at a higher height) from other adjacent packages 112. The sensors 162 can distinguish between different packages 112 because the distance or depth between the package 112 being lifted and the adjacent packages 112 can be different from the sensors 162.

The extraction module 208 can extract the third image data based on combining the image differences between the first image data and the second image data. For example, the first image data of the package 112-44 can include the design and/or markings, the two clear edges 112-44*b*, the corner 112-44*c*, or a combination thereof. For a further example, the second image data of the package 112-44 can include the two clear edges 12-44*g*. The extraction module 208 can extract the third image data of the package 112-44 by including the design and/or markings, the two clear edges 112-44*b*, the corner 112-44*c*, the two clear edges 112-44*g*, or a combination thereof.

For a further example, the extraction module 208 can determine the length, width, or a combination thereof of the package 112 based on the third image data. More specifically as an example, based on the clear edges, the extraction module 208 can determine the dimension including the length, the width, or a combination thereof. The extraction module 208 can transmit the third image data, the length, the width, or a combination thereof to the registration module 212.

Extraction of the third image data dynamically and in real-time provides improved performance and the accuracy of the robotic system 100 to identify and to grasp the unregistered instance of the package 112. By extracting the third image data, the robotic system 100 can identify the edges of the package 112 to differentiate from another package 112. By clearly identifying the boundaries/edges of the package 112, the robot system 100 can efficiently place the gripper system 146 on the package 112 to securely grasp and transfer the package 112. As a result, the robotic system 100 can continue to transfer the package 112 unregistered to the robotic system 100 to improve the performance of the workflow for depalletizing the packages 112

For illustrative purposes, the lift module 206 is described to execute the command to lift the package 112 but the lift module 206 can operate differently. For example, the lift module 206 can determine the CoM based on lifting the package 112. More specifically as an example, the lift module 206 can determine whether the location within the MVR where the package 112 is gripped and lifted by the gripper system 146 is above the CoM of the package 112. For a further example, the lift module 206 can determine whether the CoM is within the xy axes represented as the MVR.

The lift module 206 can determine the CoM in a number of ways. For example, the lift module 206 can determine the CoM with the F-T sensor 142 as described above. For a further example, the lift module 206 can determine whether the CoM is under the surface area represented as the MVR with the F-T sensor 142, the CoM algorithm, or a combination thereof.

Using the F-T sensor 142 and the CoM algorithms, the lift module 206 can also determine whether the location/portion within the MVR that contacts or is covered by the gripper where the package 112 coincides with or includes the CoM. For a further example, the lift module 206 can determine a new location within the MVR for the gripper system 146 to grip the package 112 if the original gripping location is not above the CoM of the package 112. More specifically as an example, the lift module 206 can determine the new location to grip relative to the original location gripped is above the CoM using the CoM algorithm discussed above. For example, the lift module 206 can calculate a vector direction based on a measured torque and/or a direction thereof. Based on the torque, the lift module 206 can estimate a location/direction of a downward force relative to the F-T sensor 142 and/or the gripper system 146. Also, the lift module 206 can calculate a distance based on a magnitude of the measured torque, a measured weight of the lifted package 112, a relationship between the gripping location and the package boundaries/edges, or a combination thereof. The lift module 206 can check if the new location (e.g., the vector direction and the distance) to grip is within the MVR. If the new location is above the CoM, the lift module 206 can verify that the CoM of the package 112 is properly determined.

If the lift module 206 determines that the location within the MVR gripped is not the CoM, the lift module 206 can execute the command to drop or lower the package 112 to where the gripper system 146 had lifted the package 112. Furthermore, the lift module 206 can execute the command for the gripper system 146 to grasp the package 112 at the new location within the MVR (by, e.g., lowering and releasing the package 112, repositioning the gripper system 146, and then regripping the package 112) and for the robotic arm 132 to lift the package 112 for the lift check distance. For additional example, the gripper system 146 can grasp at the new location within the MVR without blocking the sensors 162 from detecting the unclear edge of the package 112. The lift module 206 can transmit the registration module 212.

The robotic system 100 determining the CoM of the package 112 dynamically and in real-time provides improved performance of the robotic system 100 transferring unregistered instance of the package 112. By accurately identifying the CoM of unregistered/unrecognized packages, the stability of the gripper system 146 grasping the package 112 improves. As a result, the robotic system 100 can continue to transfer the package 112 unregistered to the robotic system 100 to improve the performance of the workflow for depalletizing the packages 112.

For illustrative purposes, the capture module 202 is described to capture the first image data, the second image data, or a combination thereof but the capture module 202 can operate differently. For example, the capture module 202 can capture a regripped image data represented the SI of the package 112 after the CoM is correctly determined as discussed above. More specifically as an example, the robotic arm 132 can lift the package 112 after the gripper system 146 grasps the package 112 at the new location within the MVR. The capture module 202 can capture the regripped image data representing the SI of the package 112 gripped at the new location within the MVR and above the CoM. The capture module 202 can transmit the regripped image data to the extraction module 208.

For illustrative purposes, the extraction module 208 is described extracting the third image data based on the first image data, the second image data, or a combination thereof but the extraction module 208 can operate differently. For example, the extraction module 208 can extract the third image data based on the first image data, the regripped image data, or a combination thereof similarly as described above for the extraction module 208 extracting the third image data based on the first image data, the second image data, or a combination thereof. The extraction module 208 can determine the dimension including the length, the width, or a combination thereof of the package 112 as discussed above. The extraction module 208 can transmit the third image data, the length, the width, or a combination thereof to the registration module 212.

The robotic system 100 can include a transfer module 210, which can be coupled to the extraction module 208. The transfer module 210 executes the command to transfer the package 112 to the receiving platform 120 of FIG. 1A. For example, the transfer module 210 can execute the command for the robotic arm 132 to transfer the registered or unregistered instance of the package 112 to the receiving platform 120.

The transfer module 210 can execute the command in in in a number of ways. For example, the transfer module 210 can execute the command to transfer the package 112 based on the registration status of the package 112. More specifically as an example, if the registration record 172 exists for the package 112, the transfer module 210 can execute the command for the robotic arm 132 grasping the registered instance of the package 112 to transfer the package 112 for placing on the receiving platform 120.

For a different example, if the registration record 172 does not exist, the third image data of the package 112 will be extracted as discussed above. Moreover, the transfer module 210 can execute the command for the robotic arm 132 grasping the unregistered instance of the package 112 to transfer the package 112 to the receiving platform 120. For a further example, when the robotic arm 132 lowers the package 112 to the receiving platform 120, the bottom extent of the package 112 can trigger the HDS 180 of FIG. 1A.

The height of the HDS 180 relative to the floor can be predefined as the height of the receiving platform 120 can be predefined. The transfer module 210 can determine the height of the package 112 based on a time when the bottom of the package 112 crosses the HDS 180 and a height of the gripper system 146. More specifically as an example, the transfer module 210 can determine the height of the package 112 based on the distance/difference between the location or height of the gripper system 146 when the signal (i.e., representative of the package 112 crossing the HDS 180) is received and the predefined height of the HDS 180. The transfer module 210 can transmit the height of the package 112 to the registration module 212.

The robotic system 100 determining the height of the unregistered instance of the package 112 dynamically and in real-time provides improved performance of the robotic system 100 depalletizing the packages 112. By determining the height of unregistered/unrecognized packages, the robotic system 100 can accurately identify the attributes of the packages 112 to safely grasp the package. As a result, the robotic system 100 can continuously transfer the packages 112 of same type to improve the performance of the workflow for depalletizing the packages 112

The robotic system 100 can include the registration module 212, which can be coupled to the transfer module 210. The registration module 212 registers the attribute of the package 112. For example, the registration module 212 can register (e.g., by tying or storing together) the third image data, the length, the width, the height, the weight, the CoM, or a combination thereof of the unregistered instance of the package 112. More specifically as an example, the registration module 212 can generate the registration record 172 to convert the unregistered instance of the package 112 into the registered instance of the package 112.

It should be noted that the steps of the method described above may be embodied in computer-readable media stored in a non-transitory computer-readable medium as computer instruction code. The method may include one or more of the steps described herein, which one or more steps may be carried out in any desired order including being carried out simultaneously with one another. For example, two or more of the steps disclosed herein may be combined in a single step and/or one or more of the steps may be carried out as two or more sub-steps. Further, steps not expressly disclosed or inherently present herein may be interspersed with or added to the steps described herein, or may be substituted for one or more of the steps described herein as will be appreciated by a person of ordinary skill in the art having the benefit of the instant disclosure.

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or modules are presented in a given order, alternative implementations may perform routines having steps, or employ systems having modules, in a different order, and some processes or modules may be deleted, moved, added, subdivided, combined, and/or modified to provide alternative or sub-combinations. Each of these processes or modules may be implemented in a variety of different ways. Also, while processes or modules are at times shown as being performed in series, these processes or modules may instead be performed or implemented in parallel, or may be performed at different times. Further, any specific numbers noted herein are only examples; alternative implementations may employ differing values or ranges.

As used herein, the term "embodiment" means an embodiment that serves to illustrate by way of example but not limitation. It will be appreciated to those skilled in the art that the preceding examples and embodiments are exemplary and not limiting to the broad scope of the inventive concepts disclosed herein. It is intended that all modifications, permutations, enhancements, equivalents, and improvements thereto that are apparent to those skilled in the art upon a reading of the specification and a study of the drawings are included within the broad scope of the inventive concepts disclosed herein. It is therefore intended that the following appended claims include all such modifications, permutations, enhancements, equivalents, and improvements falling within the broad scope of the inventive concepts disclosed herein.

What is claimed is:

1. A method for registering a package during a robotic package handling operation, the method comprising:
   receiving first image data representative of a first surface image of a package surface;
   determining that the package is unregistered based on comparing the first surface image to a registration record;
   identifying a pair of edges for the package surface based on the first image data, wherein the pair of edges are exposed along horizontal directions and intersect each other to form a corner of the package surface;
   estimating unclear edges based on the first image data, wherein the pair of edges and the unclear edges correspond to boundaries of the package surface;
   identifying a straight line based on the first image data;
   determining a minimum viable region based on the pair of edges, wherein the minimum viable region overlaps and/or coincides with one or both of the pair of edges and wherein the minimum viable region is a continuous region that excludes the straight line, wherein the minimum viable region does not overlap with the unclear edges for gripping the package while leaving exposed portions of the package corresponding to the estimated unclear edges;
   generating one or more commands for (1) gripping the package with an end effector positioned over the minimum viable region and (2) lifting the package;
   receiving second image data representative of the package after the lift;
   determining third image data as a function of the first image data and the second image data; and
   creating registration data representative of a new registration record of the package based on the third image data for subsequently identifying other packages.

2. The method of claim 1, further comprising:
   identifying one or more new edges based on the second image data, wherein the new edges represent actual exposed edges of the package corresponding to the estimated unclear edges; and
   wherein:
   the third image data includes the one or more new edges.

3. The method of claim 2, wherein identifying the one or more new edges includes identifying the one or more new edges based on differences in depth data measured after lifting the package.

4. The method of claim 1, wherein determining the third image data includes:
   calculating a difference between the first image data and the second image data; and
   combining the first image data with the calculated difference.

5. The method of claim 1, further comprising:
   calculating a height representing a dimension of the package along a vertical direction; and
   wherein:
   the registration data includes the calculated height.

6. The method of claim 5, wherein calculating the height includes:

detecting a trigger representing a timing when the package crosses a horizontal detection plane associated with a height determination sensor located at a known height;
determining a vertical position associated with the trigger, wherein the vertical position represents a vertical location of the end effector at the timing when the package crosses the horizontal detection plane; and
calculating the height based on a difference between the known height and the vertical position.

7. The method of claim 1, further comprising:
receiving data after lifting the package, wherein the data represents a force measurement from an F-T sensor connected to or integral with the end effector;
determining a weight of the package based on the received data; and
wherein:
the registration data includes the determined weight.

8. The method of claim 1, further comprising:
receiving data after lifting the package, wherein the data represents a torque measurement from an F-T sensor connected to or integral with the end effector;
determining a center of mass location of the package based on the received data; and
wherein:
the registration data includes the center of mass location.

9. A system for registering an unregistered package during a robotic package handling operation, the system comprising:
at least one processor; and
at least one memory coupled to the at least one processor, the memory including instructions executable by the at least one processor to:
receive first image data representative of a first surface image of a package surface;
determine that the package is unregistered based on comparing the first surface image to a registration record;
identify a pair of edges for the package surface based on the first image data, wherein the pair of edges are exposed along horizontal directions and intersect each other to form a corner of the package surface;
estimate unclear edges based on the first image data, wherein the pair of edges and the unclear edges correspond to boundaries of the package surface;
identify a straight line based on the first image data;
determine a minimum viable region based on the pair of edges, wherein the minimum viable region overlaps and/or coincides with one or both of the pair of edges and wherein the minimum viable region is a continuous region that excludes the straight line, wherein the minimum viable region does not overlap with the unclear edges for gripping the package while leaving exposed portions of the package corresponding to the estimated unclear edges;
generate one or more commands for (1) gripping the package with an end effector positioned over the minimum viable region and (2) lifting the package;
receive second image data of the package, wherein the second image data represents the package after the lift;
determine third image data as a function of the first image data and the second image data; and
create registration data representative of a new registration record of the package based on the third image data for subsequently identifying other packages.

10. The system of claim 9, wherein the at least one memory includes instructions to:
receive data after lifting the package, wherein the data represents a force measurement and/or a torque measurement from an F-T sensor connected to or integral with the end effector; and
wherein:
the registration data includes the received data or a processing result thereof representative of a weight and/or a center of mass location of the package.

11. The system of claim 9, wherein the at least one memory includes instructions to:
calculate a height representing a dimension of the package along a vertical direction; and
wherein:
the registration data includes the calculated height.

12. The system of claim 11, wherein calculating the height includes:
detecting a trigger representing a timing when the package crosses a horizontal detection plane associated with a height determination sensor located at a known height;
determining a vertical position associated with the trigger, wherein the vertical position represents a vertical location of the end effector at the timing when the package crosses the horizontal detection plane; and
calculating the height based on a difference between the known height and the vertical position.

13. The system of claim 9, wherein the at least one memory includes instructions to determine the third image data based on:
calculating a difference between the first image data and the second image data; and
combining the first image data with the calculated difference.

14. A non-transitory memory medium storing computer-executable instructions, when executed by a computing system, cause the computing system to perform a method, the method comprising:
receiving first image data representative of a first surface image of a package surface;
determining that the package is unregistered based on comparing the first surface image to a registration record;
identifying a pair of edges for the package surface based on the first image data, wherein the pair of edges are exposed along horizontal directions and intersect each other to form a corner of the package surface;
estimating unclear edges based on the first image data, wherein the pair of edges and the unclear edges correspond to boundaries of the package surface;
identifying a straight line based on the first image data;
determining a minimum viable region based on the pair of edges, wherein the minimum viable region overlaps and/or coincides with one or both of the pair of edges and wherein the minimum viable region is a continuous region that excludes the straight line, wherein the minimum viable region does not overlap with the unclear edges for gripping the package while leaving exposed portions of the package corresponding to the estimated unclear edges;
generating one or more commands for (1) gripping the package with an end effector positioned over the minimum viable region and (2) lifting the package;
receiving second image data of the package, wherein the second image data represents the package after the lift;

determining third image data as a function of the first image data and the second image data; and creating registration data representative of a new registration record of the package based on the third image data for subsequently identifying other packages.

15. The non-transitory memory medium of claim 14, wherein the method further comprises:

receiving data after lifting the package, wherein the data represents a force measurement and/or a torque measurement from an F-T sensor connected to or integral with the end effector; and wherein:

the registration data includes the received data or a processing result thereof representative of a weight and/or a center of mass location of the package.

16. The non-transitory memory medium of claim 14, wherein the method further comprises:

calculating a height representing a dimension of the package along a vertical direction; and wherein:

the registration data includes the calculated height.

17. The non-transitory memory medium of claim 16, wherein the calculating the height includes:

detecting a trigger representing a timing when the package crosses a horizontal detection plane associated with a height determination sensor located at a known height;

determining a vertical position associated with the trigger, wherein the vertical position represents a vertical location of the end effector at the timing when the package crosses the horizontal detection plane; and calculating the height based on a difference between the known height and the vertical position.

18. The non-transitory memory medium of claim 14, wherein the determining the third image data includes:

calculating a difference between the first image data and the second image data; and combining the first image data with the calculated difference.

19. The method of claim 6, wherein the trigger represents the time when the package crosses the horizontal detection plane directly above and overlapping a destination location.

* * * * *

UNITED STATES PATENT AND TRADEMARK OFFICE
CERTIFICATE OF CORRECTION

PATENT NO. : 10,562,188 B1  
APPLICATION NO. : 16/443743  
DATED : February 18, 2020  
INVENTOR(S) : Rosen Diankov et al.

Page 1 of 1

It is certified that error appears in the above-identified patent and that said Letters Patent is hereby corrected as shown below:

In the Specification

In Column 1, Lines 8-9, after "which" delete "application".

In Column 6, Line 44, delete "F-sensor" and insert -- F-T sensor --, therefor.

In Column 18, Lines 9-14, delete "For example, the extraction module 208 can determine an image difference based comparing the first image data and the second image data. The image difference can represent the difference between the first image data and the second image data of the same instance of the unregistered instance of the package 112." and insert the same on Column 18, Line 8, as a continuation of the same paragraph.

In Column 18, Line 67, after "112" insert -- . --.

In Column 20, Line 39, after "command" delete "in in".

In Column 21, Line 12, after "112" insert -- . --.

Signed and Sealed this  
Twenty-third Day of November, 2021

Drew Hirshfeld  
*Performing the Functions and Duties of the  
Under Secretary of Commerce for Intellectual Property and  
Director of the United States Patent and Trademark Office*